US012067496B2

(12) United States Patent
Himanshi et al.

(10) Patent No.: US 12,067,496 B2
(45) Date of Patent: Aug. 20, 2024

(54) METHODS AND SYSTEMS FOR REDUCING BIAS IN AN ARTIFICIAL INTELLIGENCE MODEL

(71) Applicant: MASTERCARD INTERNATIONAL INCORPORATED, Purchase, NY (US)

(72) Inventors: Himanshi, New Delhi (IN); Shiv Markam, Mandla (IN); Mridul Sayana, Mumbai (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 788 days.

(21) Appl. No.: 17/236,021

(22) Filed: Apr. 21, 2021

(65) Prior Publication Data

US 2021/0334654 A1 Oct. 28, 2021

(30) Foreign Application Priority Data

Apr. 24, 2020 (IN) .............................. 202041017693

(51) Int. Cl.
*G06N 3/092* (2023.01)
*G06N 3/006* (2023.01)
*G06N 3/042* (2023.01)
*G06N 3/047* (2023.01)
*G06N 3/08* (2023.01)
*G06N 5/025* (2023.01)
*G06N 7/01* (2023.01)
*G06N 20/00* (2019.01)

(52) U.S. Cl.
CPC ............. *G06N 3/092* (2023.01); *G06N 3/042* (2023.01); *G06N 3/047* (2023.01); *G06N 3/08* (2013.01); *G06N 5/025* (2013.01); *G06N 3/006* (2013.01); *G06N 7/01* (2023.01); *G06N 20/00* (2019.01)

(58) Field of Classification Search
CPC ........... G06N 3/006; G06N 3/02; G06N 3/04; G06N 3/042; G06N 3/047; G06N 3/08; G06N 3/092; G06N 5/025; G06N 7/01; G06N 20/00; G06N 20/10; G06N 20/20
See application file for complete search history.

(56) References Cited

U.S. PATENT DOCUMENTS

2018/0300400 A1* 10/2018 Paulus .................. G06N 3/044
2020/0175364 A1* 6/2020 Xu ......................... G06N 3/045
2020/0234113 A1* 7/2020 Liu ......................... G06N 7/01

* cited by examiner

*Primary Examiner* — Shane D Woolwine
(74) *Attorney, Agent, or Firm* — Jordan IP Law, LLC

(57) ABSTRACT

Embodiments provide methods and systems for reducing bias in an artificial intelligence model. A method includes computing, by a processor, a reward value based at least in part on a similarity between model predictions from a pre-trained model and agent predictions from a Reinforcement Learning (RL) agent. The method includes performing each step of one or more steps of a rule of a plurality of rules. The rule is assigned a weight and the rule includes a protected attribute, a cumulative statistic value type, and a comparison threshold. The method includes sending a cumulative reward value generated using the reward value and each weighted punishment value computed based at least in part on applying each rule of the plurality of rules to the RL agent. The RL agent learns to biases from the agent predictions while maintaining similarity with model predictions by maximizing the cumulative reward value.

20 Claims, 13 Drawing Sheets

METHODS AND SYSTEMS FOR REDUCING BIAS IN AN ARTIFICIAL INTELLIGENCE MODEL

TECHNICAL FIELD

The present disclosure relates to artificial intelligence and machine learning models and, more particularly to, methods and systems for reducing bias in an artificial intelligence model using reinforcement learning.

BACKGROUND

Machine Learning (ML) is an application or a subset of Artificial Intelligence (AI) that allows machines to learn from data without being programmed explicitly. A machine learning model (hereinafter alternatively referred to as "model") is the output generated when a machine learning algorithm is trained with a training dataset. Further, machine learning uses a massive amount of structured and semi-structured data so that a machine learning model can generate accurate results or give predictions based on that data. The predictions are used to drive decisions and optimize for certain outcomes. However, machine learning algorithms do not prevent and automate how to structure the input data and training pipeline in such a way that it does not lead to bias and negative self-reinforcing loops. Moreover, if the input data itself has some inherent biases, the model not only learns those biases but ends up amplifying them. With biased data, the outcomes of the model end up in self-fulfilling predictions, which in many instances leads to disastrous consequences.

The most common approach for reducing or removing a bias from a model is to explicitly remove variables that are associated with bias. For example, an enterprise wants to use an AI model to predict who should be hired for a position. Relevant inputs such as the skills and experience of an applicant are included as input dataset and irrelevant information such as gender, race, and age that may end up as biases are excluded. However, this approach does not work because some of the variables that are included are influenced by latent inputs. In other words, even if gender is excluded from the model, there will be other variables present in the model that would help encode someone's gender. Therefore, if the data is biased, which is very likely in this case, the model finds a way to encode that information when given a large and comprehensive set of features/variables.

Another approach for reducing bias is to get more input data for the bias and being fed to the model. For example, a model is developed to predict recidivism rates and has a much higher rate of false positives among African Americans than Caucasian population. Even if race is excluded as an input to score a person's recidivism risk, the other features might be correlated with race and encourage bias when judging an applicant's risk. This can be solved by getting more data for the opposite example where the African Americans are not becoming repeat offenders, but in a lot of cases, instantly getting data for the desired cases is very difficult and even more difficult in cases of minorities. This kind of data can be generated artificially but is not very accurate if one is not an expert in the field. The model ends up giving too much weight to a specific feature of the data like race, gender or nationality while making predictions, which is not correct ethically or even technically because this is a result of lack of data with enough variance for every combinations of features.

Accordingly, there is a need for techniques that enable reducing biases in an AI model by training a software agent using reinforcement learning based on developing a plurality of rules which check for the biases and give corresponding punishments to the agent for learning to reduce the biases.

SUMMARY

Various embodiments of the present disclosure provide systems, methods, electronic devices and computer program products for reducing biases in an Artificial Intelligence model using reinforcement learning.

In an embodiment, a computer-implemented method is disclosed. The method includes computing, by a processor, a reward value based at least in part on a similarity between a plurality of model predictions from a pre-trained model and a plurality of agent predictions from a Reinforcement Learning (RL) agent. The method includes, performing, by the processor, each step of one or more steps of a rule of a plurality of rules. The rule is assigned a weight and the rule includes a protected attribute, a cumulative statistic value type, and a comparison threshold. For the one or more steps, the method includes extracting, by the processor, a set of biased agent predictions from the plurality of agent predictions corresponding to each biased record of a set of biased records. The set of biased records is generated from a plurality of records of an input dataset fed to the RL agent. For a biased record of the set of biased records, an attribute value of the protected attribute is within a pre-determined set of biased values of the protected attribute. The method includes computing, by the processor, a biased cumulative statistic value being a type of the cumulative statistic value for the set of biased agent predictions. The method includes extracting, by the processor, a set of unbiased agent predictions from the plurality of agent predictions corresponding to each unbiased record of a set of unbiased records. The set of unbiased records is generated from the plurality of records of the input dataset fed to the RL agent. For an unbiased record of the set of unbiased records, the attribute value of the protected attribute is within a pre-determined set of unbiased values of the protected attribute. The method includes computing, by the processor, an unbiased cumulative statistic value being a type of the cumulative statistic value for the set of unbiased agent predictions. If a difference between the biased cumulative statistic value and the unbiased cumulative statistic value is greater than the comparison threshold, the method includes determining, by the processor, a punishment value based at least in part on the difference between the biased cumulative statistic value and the unbiased cumulative statistic value. The method includes computing, by the processor, a weighted punishment value using the assigned weight of the rule and the punishment value. Furthermore, the method includes sending, by the processor, a cumulative reward value generated using the reward value and each weighted punishment value computed based at least in part on applying each rule of the plurality of rules to the RL agent. The RL agent learns to reduce a plurality of biases from the plurality of agent predictions while maintaining similarity with the plurality of model predictions by maximizing the cumulative reward value.

In another embodiment, a computing system is provided. The computing system includes a memory including executable instructions and a processor. The processor is configured to execute the instructions to cause the computing system to at least compute a reward value based at least in part on a similarity between a plurality of model predictions from a pre-trained model and a plurality of agent predictions from a Reinforcement Learning (RL) agent. The computing system is further caused to perform each step of one or more steps of a rule of a plurality of rules. The rule is assigned a weight and the rule includes a protected attribute, a cumulative statistic value type, and a comparison threshold. For the one or more steps, the computing system is caused to extract a set of biased agent predictions from the plurality of agent predictions corresponding to each biased record of a set of biased records. The set of biased records is generated from a plurality of records of an input dataset fed to the RL agent. For a biased record of the set of biased records, an attribute value of the protected attribute is within a pre-determined set of biased values of the protected attribute. The computing system is caused to compute a biased cumulative statistic value being a type of the cumulative statistic value for the set of biased agent predictions. The computing system is caused to extract a set of unbiased agent predictions from the plurality of agent predictions corresponding to each unbiased record of a set of unbiased records. The set of unbiased records is generated from the plurality of records of the input dataset fed to the RL agent. For an unbiased record of the set of unbiased records, the attribute value of the protected attribute is within a pre-determined set of unbiased values of the protected attribute. The computing system is caused to compute an unbiased cumulative statistic value being a type of the cumulative statistic value for the set of unbiased agent predictions. If a difference between the biased cumulative statistic value and the unbiased cumulative statistic value is greater than the comparison threshold, the computing system is caused to determine a punishment value based at least in part on the difference between the biased cumulative statistic value and the unbiased cumulative statistic value. The computing system is caused to compute a weighted punishment value using the assigned weight of the rule and the punishment value. Furthermore, the computing system is caused to send a cumulative reward value generated using the reward value and each weighted punishment value computed based at least in part on applying each rule of the plurality of rules to the RL agent. The RL agent learns to reduce a plurality of biases from the plurality of agent predictions while maintaining similarity with the plurality of model predictions by maximizing the cumulative reward value.

In yet another embodiment, a computer program product is provided. The computer program product includes at least one non-transitory computer-readable storage medium. The computer-readable storage medium includes a set of instructions, which, when executed by one or more processors in an electronic device, causes the electronic device to at least compute a reward value based at least in part on a similarity between a plurality of model predictions from a pre-trained model and a plurality of agent predictions from a Reinforcement Learning (RL) agent. The electronic device is further caused to perform each step of one or more steps of a rule of a plurality of rules. The rule is assigned a weight and the rule includes a protected attribute, a cumulative statistic value type, and a comparison threshold. For the one or more steps, the electronic device is caused to extract a set of biased agent predictions from the plurality of agent predictions corresponding to each biased record of a set of biased records. The set of biased records is generated from a plurality of records of an input dataset fed to the RL agent. For a biased record of the set of biased records, an attribute value of the protected attribute is within a pre-determined set of biased values of the protected attribute. The electronic device is caused to compute a biased cumulative statistic value being a type of the cumulative statistic value for the set of biased agent predictions. The electronic device is caused to extract a set of unbiased agent predictions from the plurality of agent predictions corresponding to each unbiased record of a set of unbiased records. The set of unbiased records is generated from the plurality of records of the input dataset fed to the RL agent. For an unbiased record of the set of unbiased records, the attribute value of the protected attribute is within a pre-determined set of unbiased values of the protected attribute. The electronic device is caused to compute an unbiased cumulative statistic value being a type of the cumulative statistic value for the set of unbiased agent predictions. If a difference between the biased cumulative statistic value and the unbiased cumulative statistic value is greater than the comparison threshold, the electronic device is caused to determine a punishment value based at least in part on the difference between the biased cumulative statistic value and the unbiased cumulative statistic value. The electronic device is caused to compute a weighted punishment value using the assigned weight of the rule and the punishment value. Furthermore, the electronic device is caused to send a cumulative reward value generated using the reward value and each weighted punishment value computed based at least in part on applying each rule of the plurality of rules to the RL agent. The RL agent learns to reduce a plurality of biases from the plurality of agent predictions while maintaining similarity with the plurality of model predictions by maximizing the cumulative reward value.

BRIEF DESCRIPTION OF THE FIGURES

For a more complete understanding of example embodiments of the present technology, reference is now made to the following descriptions taken in connection with the accompanying drawings in which.

Figure 1:
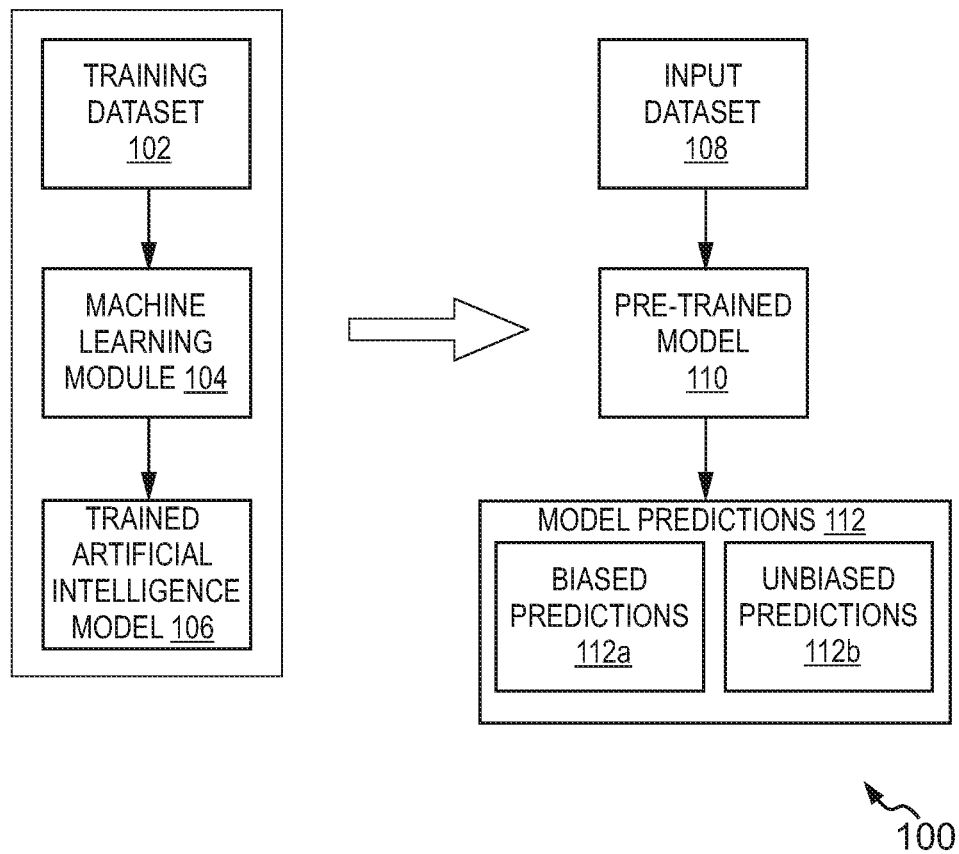
FIG. 1 is a block diagram representation of a pre-trained model, in accordance with an example embodiment.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" at various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "Reinforcement Learning (RL)", used throughout the description, refers to training a software agent (interchangeably referred to as "agent" or "RL agent") in an interactive and rewarding environment, essentially giving the experience to the agent. Reinforcement learning is an area of machine learning concerned with how the agent takes actions in an environment in order to maximize cumulative rewards. The agent can choose any action as a function of the history. When the agent's performance is compared to that of a pre-trained Artificial Intelligence (AI) model (another agent) that acts optimally, the difference in performance gives rise to the notion of regret/punishment. In order to act optimally, the agent must reason about the long-term consequences of its actions, although the immediate reward associated with this might be negative (i.e., a punishment).

Overview

Various example embodiments of the present disclosure provide methods, computing systems, electronic devices and computer program products for reducing a plurality of biases in an Artificial Intelligence (AI) model by training a software agent using reinforcement learning via applying a plurality of rules.

In various example embodiments, the present disclosure provides a computing system that at least includes a pre-trained AI model (hereinafter referred to as "pre-trained model" or "model"), a Reinforcement Learning (RL) agent, and a plurality of rules to be applied to a plurality of agent predictions of the RL agent for reducing a plurality of biases from the model. The pre-trained model is the AI model trained using a training dataset. In one embodiment, the pre-trained model is given an input dataset (other than the training dataset) to get a plurality of model predictions, and the same input dataset is given to the RL agent (e.g., a neural network algorithm) to generate corresponding plurality of agent predictions using reinforcement learning.

The input dataset includes a plurality of records. Each record of the plurality of records is sent to the RL agent sequentially. Similarly, each record of the plurality of records is sent to the pre-trained model sequentially. Further, a record of the plurality of records includes a plurality of attribute values of a corresponding plurality of attributes. An attribute is sometimes referred to as a feature. Features are individual independent variables that act as the input in a model and are assigned corresponding feature values. The model uses feature values to generate model predictions.

In at least one embodiment, the pre-trained model is biased. It means that a model prediction of the plurality of model predictions is a biased prediction. Bias can enter in the model through protected attributes in the training dataset. The pre-trained model generates the biased prediction if an attribute value of a protected attribute of the plurality of attributes of a record is within a pre-determined set of biased values of the protected attribute. The pre-trained model generates an unbiased prediction if an attribute value of the protected attribute is within a pre-determined set of unbiased values of the protected attribute.

The rewards are given to the RL agent based on determining similarity between the agent predictions and the model predictions via a similarity module. Rewards help the agent replicate the working of the pre-trained model. In one embodiment, an interpreter receives a reward value from the similarity module and feeds the reward value to the agent for the reinforcement learning. To identify the bias and to reduce the bias from the pre-trained model, the punishments are provided by applying one or more rules of the plurality of rules developed to check for the plurality of biases in the plurality of agent predictions. Punishments (i.e., negative rewards) help the agent learn which paths to avoid while making decisions such as trying not to break multiple rules.

The computing system is configured to perform each step of one or more steps of a rule of the plurality of rules. Essential parameters of a rule include the protected attribute, a cumulative statistic value type, a comparison threshold and a weight assigned to the rule. In one embodiment, a set of biased records from the plurality of records of the input dataset is generated. For a biased record of the set of biased records, an attribute value of the protected attribute is within the pre-determined set of the biased values of the protected attribute. A set of unbiased records from the plurality of records is also generated. For an unbiased record of the set of unbiased records, an attribute value of the protected attribute is within the pre-determined set of unbiased values of the protected attribute.

A set of biased agent predictions from the plurality of agent predictions corresponding to each biased record of the set of biased records is extracted. A set of unbiased agent predictions from the plurality of agent predictions corresponding to each unbiased record of the set of unbiased records is extracted. A biased cumulative statistic value being a type of the cumulative statistic value for the set of biased agent predictions is computed. An unbiased cumulative statistic value being a type of the cumulative statistic value for the set of unbiased agent predictions is generated. A difference between the biased cumulative statistic value and the unbiased cumulative statistic value is determined.

If the difference is greater or equal to the comparison threshold, a punishment value is determined based at least in part on the difference between the biased cumulative statistic value and the unbiased cumulative statistic value. A weighted punishment value is computed by multiplying the assigned weight of the rule and the punishment value. A cumulative reward value is generated by subtracting each weighted punishment value computed based at least in part on applying each rule of the plurality of rules from the reward value sent by the interpreter using the similarity module. The cumulative reward value is sent to the RL agent. The RL agent learns to reduce the plurality of biases from the plurality of agent predictions while maintaining similarity with the plurality of model predictions by maximizing the cumulative reward value.

In one embodiment, another rule (e.g., another approach) of the plurality of rules is applied to determine the weighted punishment value for the agent learning. A set of modified records is generated by replacing the attribute value of the protected attribute of each biased record of the set of biased records with a pre-determined unbiased value belonging to the pre-determined set of unbiased values of the protected attribute. Each modified record of the set of modified records is sent to the RL agent sequentially. A set of modified agent predictions from the RL agent is received. Each modified agent prediction of the set of modified agent predictions is generated for each modified record of the set of modified records. A modified cumulative statistic value being a type of the cumulative statistic value for the set of modified agent predictions is computed. If a difference between the biased cumulative statistic value and the modified cumulative statistic value is equal to or greater than the comparison threshold, a punishment value is determined based on the difference between the biased cumulative statistic value and the modified cumulative statistic value.

A weighted punishment value is computed by multiplying the assigned weight of the rule and the punishment value. A cumulative reward value is generated by subtracting the weighted punishment value computed based on applying the new rule from the reward value. The cumulative reward value is sent to the RL agent. The RL agent learns to reduce the plurality of biases from the plurality of agent predictions while maintaining similarity with the plurality of model predictions by maximizing the cumulative reward value.

In one embodiment, if a new rule is added, the weight of the rule is kept higher for a new rule than the older rules, initially. Assigning a higher weight helps speed up the integration of the new rule. The weight is slowly decreased with each occurrence of the instance so that the agent can develop new states and paths to deal with those instances sooner. The decrement of the weight is stopped once a pre-set weight value is reached for the new rule. An exponential function is used to trade over a time-period until the weight reaches the pre-set weight. The higher weight is applied only for the new rule for an existing bias or a new bias so that the agent has seen enough examples to reach the pre-set weight value. Various example embodiments of present disclosure are described hereinafter with reference to FIGS. 1 to 9.

FIG. 1 is a block diagram representation 100 of a pre-trained model, in accordance with an example embodiment. Computers can be trained to accomplish specific tasks by processing large amounts of data and recognizing patterns in the data using Artificial Intelligence (AI). AI makes it possible for computers to learn from experience, adjust to new inputs and perform human-like tasks. As shown, a training dataset 102 is fed to a machine learning module 104. The machine learning module 104 includes a machine learning algorithm which learns by its own using the training dataset 102. Trained predictions generated using the training dataset 102 are used by the machine learning module 104 to come up with a trained AI model 106/computer program (hereinafter referred to as "trained model 106"). Apart from the training dataset 102, a test dataset and a verification dataset are also fed to the trained model 106 at various stages of training. For example, the test dataset is used to test each iteration and the verification dataset is used to verify the results or verify that the trained model 106 is working properly after whole process is complete.

Further, the trained model 106 works only for specific domains such as if the trained model 106 is developed to detect images of a rose, it only gives result for rose images, but if a new data like an image of a jasmine is provided, then the trained model 106 becomes unresponsive. In at least one embodiment, the trained model 106 is biased. The trained model 106 is hereinafter referred to as a pre-trained model 110. The pre-trained model 110 (hereinafter alternatively referred to as "model 110") is given an input dataset 108 to generate a plurality of model predictions 112 (hereinafter alternatively referred to as "model predictions 112"). The same input dataset 108 is fed to a software agent (not shown in FIG. 1, hereinafter alternatively referred as "RL agent") (e.g., a neural network algorithm) to generate a plurality of agent predictions (not shown in FIG. 1) using reinforcement learning to identify the bias and to reduce the bias from the pre-trained model 110 by applying a plurality of rules. The input dataset 108 fed to the model 110 and the RL agent during the training of the RL agent is different from training dataset 102 fed to the machine learning module 104 for training the trained model 106.

The input dataset 108 includes a plurality of records. Each record of the plurality of records of the input dataset 108 is sequentially fed to the pre-trained model 110. Further, a record of the plurality of records includes a plurality of attributes. A corresponding attribute value is associated with each attribute of the plurality of attributes.

The present disclosure is hereinafter explained with reference to the model 110 being a loan repay model trained to predict if an applicant will repay the loan for a loan application. The model 110 makes the model predictions 112 (i.e., yes or no for each applicant of a plurality of applicants)) using the input dataset 108, where a plurality of records (e.g., other loan applications) and actual outcomes (e.g., whether the loan was repaid) are provided. A machine learning algorithm attempts to find patterns, or generalizations, in the input dataset 108 to use when a model prediction for a new record is needed. For example, one pattern that the model 110 may discover is "if an applicant has a salary greater than INR 40,000 and has outstanding debt less than INR 500, he will repay the loan".

However, sometimes the patterns that are found may not be desirable or may even be illegal. In case of appearances of new biases or in cases where it is uncertain if some features could be discriminating or not, it is difficult to make the model 110 understand such cases without enough data which makes the model 110 absolute and does not give much flexibility. For example, the model 110 may determine that age plays a significant role in the prediction of repayment of the loan because the input dataset 108 happens to have better repayment for one age group than for another age group. This may occur because the input dataset 108 may not be representative of the true population of people of all age groups. Even if the input dataset 108 is representative of the true population of people of all age groups, it is illegal to base any decision on an applicant's age, regardless of whether this is a good prediction made by the model 110 based on the historical data.

A plurality of applicants represents a plurality of records of the input dataset 108 for the model 110. A plurality of attributes of a record includes age, state, religion, gender, salary, rate of loan repayment, outstanding debt value etc. of an applicant. An example of a unique attribute value of each attribute in this scenario would be '45 (years)', 'Karnataka', 'Hindu', 'Female', '60,000 (INR)', '55%', '5000 (INR)', respectively. Similarly, the next record may have attribute values for the corresponding plurality of attributes as '75 (years)', 'Karnataka', 'Christian', 'Male', '15,000 (INR)', '25%', '1000 (INR)', respectively.

In at least one embodiment, the model 110 is a biased model. It means that the plurality of model predictions 112 generated by the model 110 includes one or more of biased predictions 112a (hereinafter referred to as "biased predictions 112a") and one or more of unbiased predictions 112b (hereinafter referred to as "unbiased predictions 112b"). Bias can enter in the model 110 through protected attributes in the input dataset 108. Some non-exhaustive examples of the protected attributes include age, state, race, gender etc. of an applicant. In one scenario, the model 110 generates the biased predictions 112a for a section of society which the model 110 may be biased against. For example, the model 110 is biased against applicants who are senior citizens having age (being the protected attribute) greater than 60 years (being the attribute value of the protected attribute). In other words, if an attribute value (e.g., 67 years) of a protected attribute (age) of the plurality of attributes of a record of the plurality of records is within a pre-determined set of a biased values (e.g., 60 to 100 years) of the protected attribute (age), the model 110 generates a biased prediction of the biased predictions 112a. A biased value (e.g., age is equal to or greater than 60 years) is a threshold value beyond which the model 110 may be biased.

Also, the model 110 generates unbiased predictions 112b for another section of society for which large amount of data is available. Because of a large amount of data, there are very less chances of bias occurring. For example, for another age group of working-class applicants having the age between 30 to 40 years where enough diversity in the data is available, the model 110 generates unbiased predictions 112b. In other words, if an attribute value (e.g., 38 years) of the protected attribute (age) of the plurality of attributes of a record of the plurality of records is within a pre-determined set of unbiased values (e.g., 30 to 40 years) of the protected attribute (age), the model 110 generates an unbiased prediction of the one or more unbiased predictions 112b. Further, a difference in the approval rates for the senior citizens and working-class applicants, results in determination that the model 110 is biased. In order to reduce the plurality of biased predictions 112a from the model 110, a Reinforcement Learning agent is trained using the same input dataset 108 to generate a plurality of agent predictions. This is explained in detail with reference to FIG. 2 hereinafter.

Figure 2:
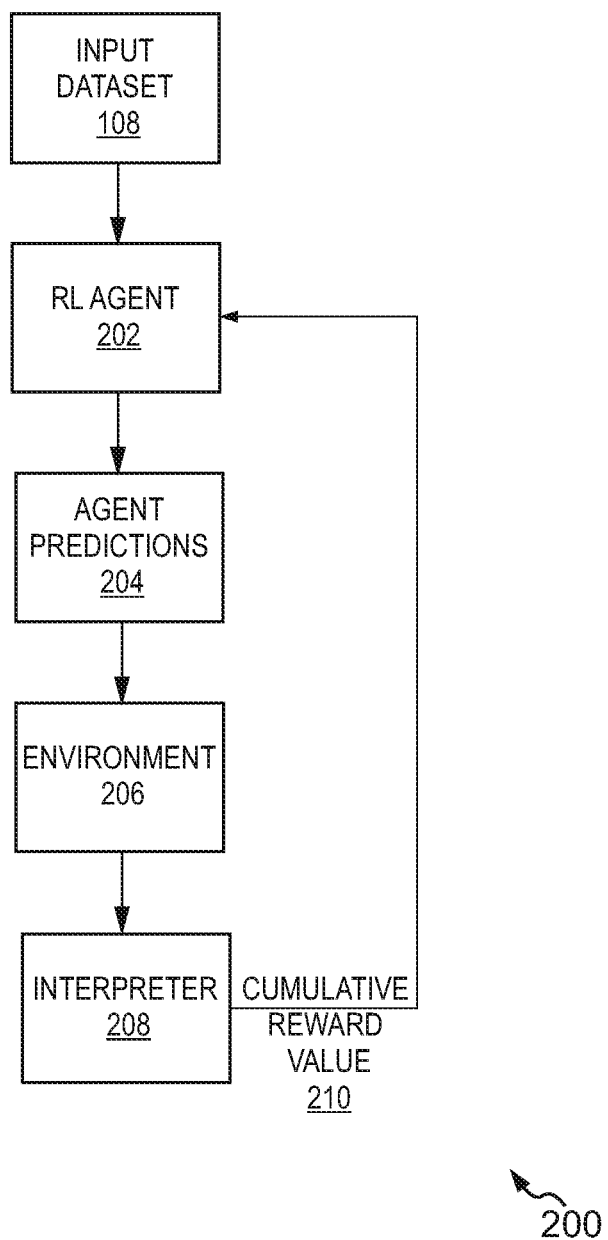
FIG. 2 is a block diagram representation of a Reinforcement Learning (RL) agent, in accordance with an example embodiment.

FIG. 2 is a block diagram representation 200 of a Reinforcement Learning (RL) agent, in accordance with an example embodiment. Reinforcement Learning (RL) is a form of machine learning where an agent learns what decisions to take depending on an environment the agent currently is in. Reinforcement Learning uses mapping between input and output by receiving rewards and punishments as signals for positive and negative behaviour. In at least one embodiment, the rewards are given based on similarity with the pre-trained model 110 and punishments are given based on applying a plurality of rules which checks for a plurality of biases in the agent predictions. The goal of a reinforcement learning agent is to maximize the total cumulative reward. For example, a rule for checking bias for different age groups in the agent predictions may be developed. The rule checks the approval rates for senior citizens and working-class applicants in the agent predictions. If the difference between the approval rates of both types of applicants is equal to or greater than a pre-determined comparison threshold, a punishment is determined based on the difference.

As shown, an RL agent 202 (hereinafter alternatively referred to as "agent 202") is fed the input dataset 108 to generate a plurality of agent predictions 204 (hereinafter referred to as "agent predictions 204"). As explained with reference to FIG. 1, the input dataset 108 includes a plurality of records. Each record of the plurality of records of the input dataset 108 is sequentially fed to the agent 202. Further, a record of a plurality of records includes a plurality of attributes. A corresponding attribute value is associated with each attribute of the plurality of attributes. Further, each agent prediction of the agent predictions 204 is generated for each record of a plurality of records of the input dataset 108.

The agent predictions 204 are fed to an environment 206. The environment 206 is a physical world in which the agent 202 operates. The agent 202 takes actions in the environment 206, which is interpreted into a cumulative reward value 210 and a representation of a state (not shown) by an interpreter 208, which are fed back into the agent 202, as shown. The agent 202 initially generates agent predictions 204 randomly for the input dataset 108 as the agent 202 has not learned anything yet.

The RL agent 202 interacts with the environment 206 at discrete time stamps. At each time stamp 't', the agent 202 receives an observation which typically includes the cumulative reward value 210 (e.g., $r_t$) from the interpreter 208. Thereafter, the agent 202 generates an agent prediction (e.g., $a_t$) of the agent predictions 204, which is subsequently sent to the environment 206. The environment 206 moves to a new state (e.g., $s_{t+1}$) and the cumulative reward value 210 (e.g., $r_{t+1}$) associated with the transition (e.g., $s_t$, $a_t$, $s_{t+1}$) is determined by the interpreter 208. In one example embodiment, Q-learning approach is used for training the RL agent 202. Q-values are updated by performing an action '$a_t$' (i.e., an agent prediction) in a state '$s_t$' at a time stamp 't'. The following value update equation is used in the Q-learning algorithm.

$$Q^{new}(s_t, a_i) \leftarrow (1 - \alpha) \cdot \underbrace{Q(s_t, a_i)}_{\text{old value}} +$$

$$\underbrace{\alpha}_{\text{learning rate}} \cdot \Bigg( \underbrace{\overbrace{\underbrace{r_t}_{\text{reward}} + \underbrace{\gamma}_{\text{discount factor}} \cdot \underbrace{\max_a Q(s_{t+1}, a)}_{\text{estimate of optimal future value}}}^{\text{learned value}}} \Bigg)$$

where $s_t$ is the state of the environment 206 at a time stamp 't' and $a_t$ is the action/agent prediction at the time stamp t.

In one example embodiment, Markov Decision Processes (MDPs) are used to train the agent 202. MDPs are mathematical frameworks for describing an environment in Reinforcement Leaning. In at least one embodiment, advanced algorithms such as Deep Q-Networks (DQNs) which use Neural Networks to estimate Q-values for each agent prediction and update the Q-values for the agent predictions 204 based on rewards and punishments (collectively referred as the cumulative reward value 210) are used. The neural network helps to speed up the training and makes the agent 202 more intuitive to learn the model 110.

In one example embodiment, for a selected attribute value of an attribute, the agent 202 can generate one of three outcomes such as predict '1' (assuming binary classification), predict '0' or select another attribute. Given each combination of attributes based on the attribute value of those attributes, the neural network effectively weighs those attributes and gives a prediction of the reward or punishment such as predicting '1' or '0'. This is (i.e., learning of the agent 202) is explained in detail with reference to FIGS. 6A and 6B later. Moreover, selection of actions by the agent 202 can be entirely greedy, i.e. taking the action with the best Q-value or partially exploratory using algorithms like ε-greedy, Upper Confidence Bounds (UCB), Kullback-Leibler UCB (KL-UCB), Thompson Sampling and the like. In at least one embodiment, the agent predictions 204 and the model predictions 112 are sent to a similarity module to determine the similarity between both the predictions for generating a reward value. This is explained hereinafter with reference to FIG. 3.

Figure 3:
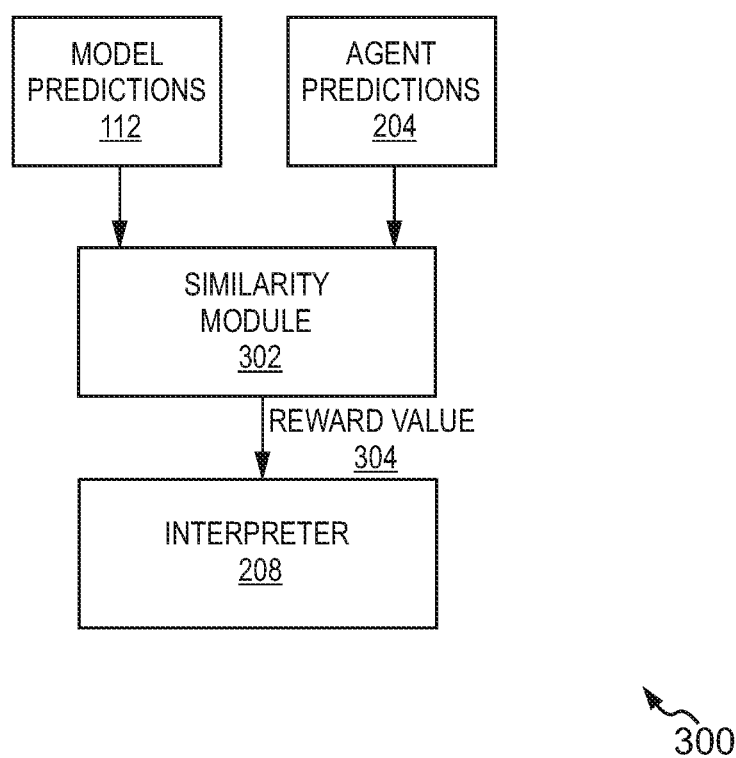
FIG. 3 is a block diagram representation of a similarity module, in accordance with an example embodiment.

FIG. 3 is a block diagram representation 300 of a similarity module, in accordance with an example embodiment. The agent 202 gets a reward based on how close the agent 202 predicts the values to the values predicted by the pre-trained model 110. The reward helps the agent 202 replicate the working of the pre-trained model 110. In an example embodiment, the initial value of a reward is set to '0'. The agent 202 tries to set the weights in the neural network so as to maximize its rewards through each iteration which ultimately leads the agent 202 to learn the model's workings. In at least one embodiment, a similarity module 302 is used to receive the model predictions 112 and the agent predictions 204.

The similarity module includes an algorithm that applies a similarity function on both the predictions to compute the similarity between the both. A reward value 304 computed based on the similarity by the similarity module 302 is fed to the interpreter 208. In one example embodiment, a similarity function such as the cosine similarity is used to determine similarity between the predictions such that the reward value 304 can be '1' at maximum. In one embodiment, the interpreter 208 generates the cumulative reward value 210 by adding the reward value 304 to an applicable punishment received by the agent 202 based on application of a rule of the plurality of rules developed for reducing the plurality of biases present in the agent predictions 204.

Figure 4:
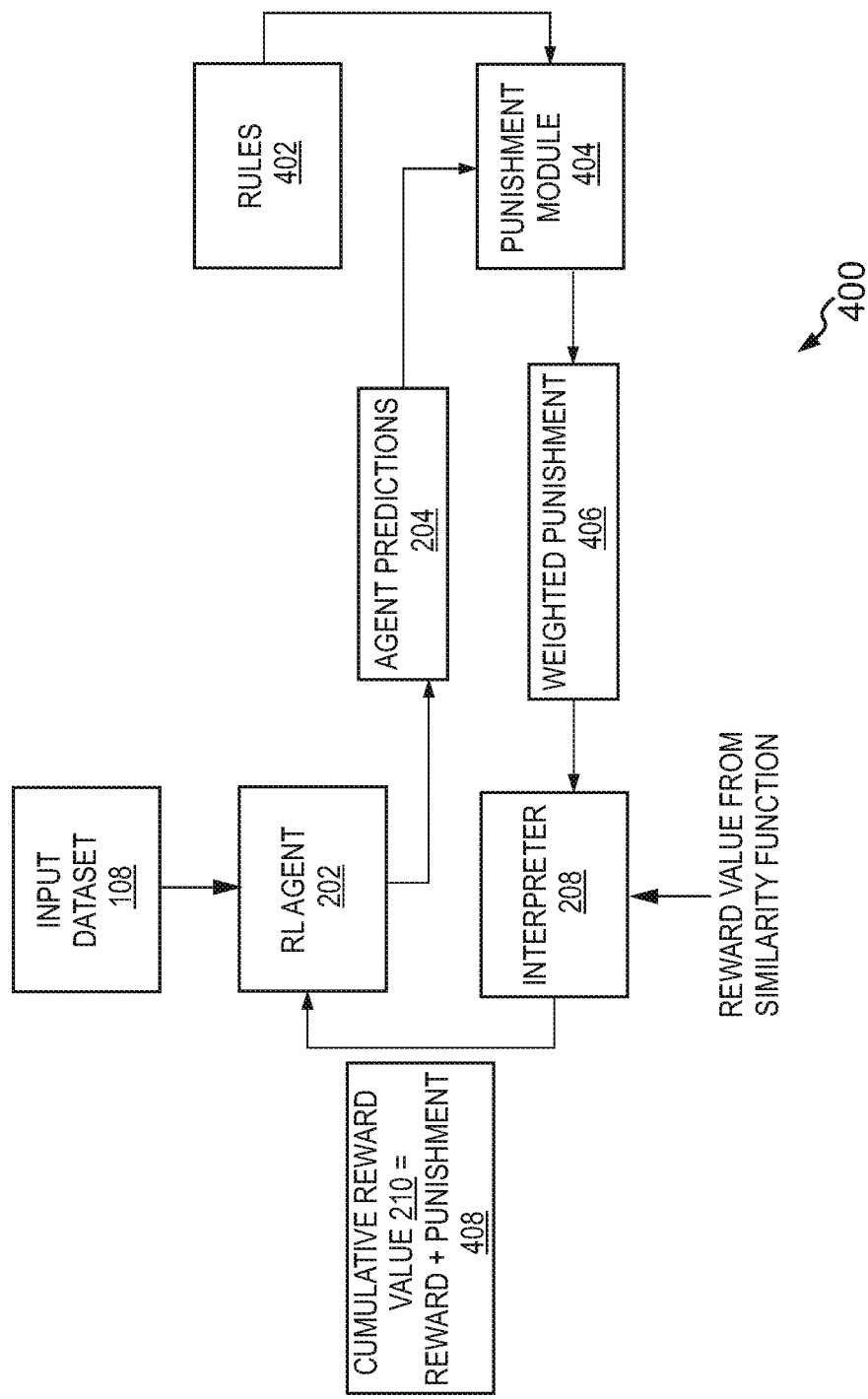
FIG. 4 is a block diagram representation of training the RL agent by applying a plurality of rules for reducing a plurality of biases present in a plurality of agent predictions, in accordance with an example embodiment.

FIG. 4 is a block diagram representation 400 of training a Reinforcement Learning agent by applying a plurality of rules for reducing a plurality of biases present in the plurality of agent predictions, in accordance with an example embodiment. As shown, the input dataset 108 is fed to the agent 202 to generate the plurality of agent predictions 204. The agent predictions 204 are further fed to a punishment module 404 to compute a weighted punishment value 406 based on applying a rule of a plurality of rules 402 (hereinafter alternatively referred to as "rules 402") developed for reducing the biases from the agent predictions 204. A rule checks for different possible biases in the agent predictions 204 and gives punishments according to their severity. Punishments (negative rewards) help the RL agent 202 learn which paths to avoid while making decisions such as trying not to break multiple rules of the rules 402 developed for the environment 206.

In one embodiment, the weighted punishment value 406 is addition of each corresponding weighted punishment value computed by the punishment module 404 based on applying each rule of the rules 402. Further, the weighted punishment value 406 is fed to the interpreter 208 to generate the cumulative reward value 210. As explained with reference to FIG. 3, the interpreter 208 also receives the reward value 304 from the similarity module 302 generated based on similarity between the agent predictions 204 and the model predictions 112. The interpreter 208 computes the cumulative reward value 210 by adding the weighted punishment value 406 to the reward value 304. Alternatively, the interpreter 208 computes the cumulative reward value 210 by subtracting each weighted punishment value computed based on applying each rule of the plurality of rules 402 from the reward value 304. The interpreter 208 sends the computed cumulative reward value 210 to the RL agent 202 for learning. In an example embodiment, instead of generating the cumulative reward value 210 as explained hereinabove, corresponding rewards and punishments are generated for each record of input dataset 108 and sent via the interpreter 208 to the agent 202 for the learning of the agent 202.

The RL agent 202 learns to reduce a plurality of biases from the plurality of agent predictions 204 while maintaining similarity with the plurality of model predictions 112 by maximizing the cumulative reward value 210. As the agent 202 is trying to maximize the cumulative reward value 210, the agent 202 tries to avoid breaking the rules 402 as much as possible at the cost of some accuracy. One or more steps of a rule of the rules 402 as applied to compute the weighted punishment value 406 by the punishment module 404 are explained hereinafter with reference to FIGS. 5A and 5B.

Figure 5A:
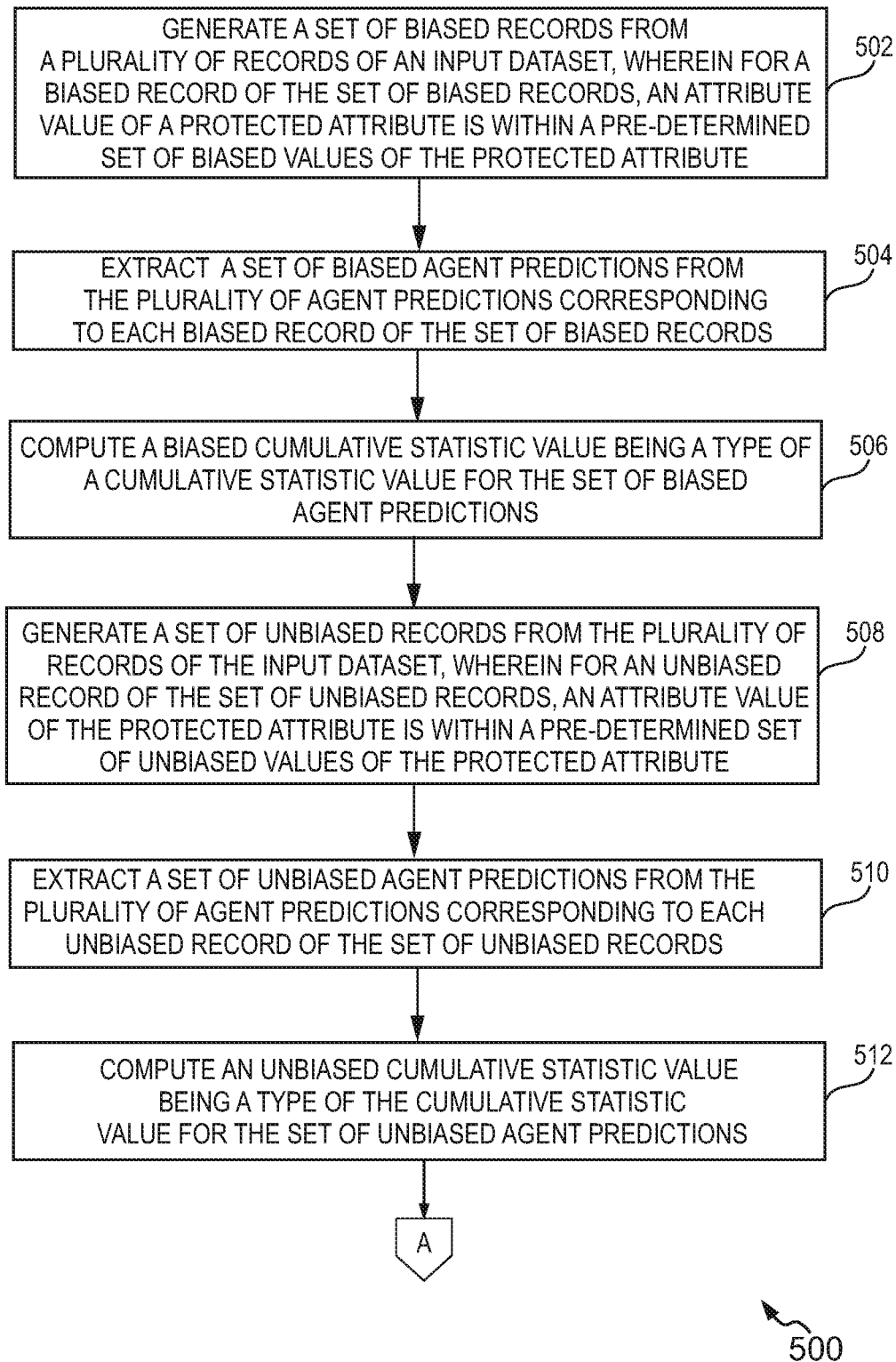
FIGS. 5A and 5B collectively illustrate a flow diagram of a method for determining a weighted punishment value, in accordance with an example embodiment.
Figure 5B:
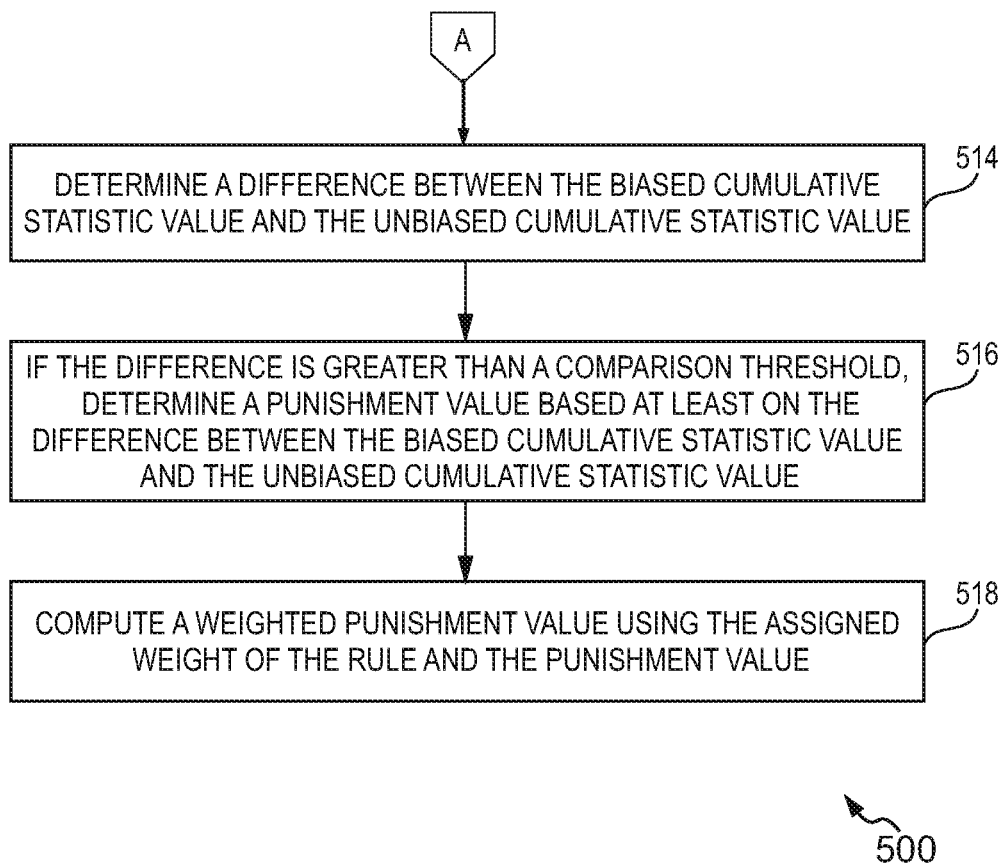

FIGS. 5A and 5B collectively illustrate a flow diagram of a method 500 for determining a weighted punishment value, in accordance with an example embodiment. More specifically, the method 500 includes one or more steps of a rule of the plurality of rules 402 performed by a computing system to determine the weighted punishment value 406 to be sent to the agent 202 based on identifying a plurality of biases present in the agent predictions 204 for maximizing the cumulative reward value 210. The rule is assigned a weight and the rule includes a protected attribute, a cumulative statistic value type, and a comparison threshold. The method 500 starts at step 502.

At 502, a set of biased records from the plurality of records of the input dataset 108 is generated. For a biased record of the set of biased records, an attribute value of the protected attribute is within a pre-determined set of biased values of the protected attribute. Considering the model 110 being the loan repay model example as explained with reference to FIG. 1, if an attribute value (e.g., 67 years) of the protected attribute (age) of the plurality of attributes of a record of the plurality of records is within the pre-determined set of biased values (e.g., 60 to 100 years) of the protected attribute (age), a record is referred as a biased record. Accordingly, a set of such biased records is generated from the input dataset 108. It is noted that each record includes the protected attribute having a unique attribute value. For example, an applicant's age is 65, another applicant's age is 77 and so on.

At 504, a set of biased agent predictions from the plurality of agent predictions 204 corresponding to each biased record of a set of biased records is extracted. As the RL agent 202 is fed the input dataset 108, and the set of biased records is generated from the input dataset 108, a corresponding set of biased agent predictions generated by the agent 202 is extracted. For example, the set of biased records includes values 62, 67, 78 and 80. The corresponding set of biased agent predictions for the senior citizens in binary calculation include values 1, 0, 0 and 0. The binary value '0' as an agent prediction (i.e., a biased agent prediction) denotes denial that the applicants of age 67, 78 and 80 years will not repay the loan. The binary value '1' as an agent prediction (i.e., an unbiased agent prediction) denotes approval that the applicant of age 62 years will repay the loan. This may be the case where the agent 202 has learned from other attributes of the applicant such as a salary, the outstanding debt amount and the loan repay rates that he will repay the loan by generating an unbiased prediction.

At 506, a biased cumulative statistic value being a type of the cumulative statistic value is computed for the set of biased agent predictions. For the set of biased agent predictions for the senior citizens including values 1, 0, 0 and 0, the biased cumulative statistic value is an approval rate of 25% for the senior citizens.

At 508, a set of unbiased records from the plurality of records of the input dataset 108 is generated. For an unbiased record of the set of unbiased records, an attribute value of the protected attribute is within the pre-determined set of the unbiased values of the protected attribute. If an attribute value (e.g., 38 years) of the protected attribute (age) of the plurality of attributes of a record of the plurality of records is within a pre-determined set of unbiased values (e.g., 30 to 40 years) of the protected attribute (age), a record is referred as an unbiased record. Accordingly, a set of such unbiased records is generated from the input dataset 108.

At 510, a set of unbiased agent predictions from the plurality of agent predictions 204 corresponding to each unbiased record of the set of unbiased records is extracted. As the RL agent 202 is fed the input dataset 108, and the set of unbiased records is generated from the input dataset 108, a corresponding set of unbiased agent predictions generated by the agent 202 is extracted. For example, the set of unbiased records includes values 32, 35, 37 and 40. The corresponding set of unbiased agent predictions for the working class applicants includes values 0, 1, 1 and 1. The binary value '1' as an agent prediction (i.e., an unbiased agent prediction) denotes approval that the applicants of age 35, 37 and 40 years will repay the loan. The binary value '0' as an agent prediction (i.e., a biased agent prediction) denotes denial that the applicant of age 32 years will not repay the loan. This may be the case where the agent 202 has learned from other attributes of the applicant such as salary, the outstanding debt amount and the loan repay rates that he will not repay the loan.

At 512, an unbiased cumulative statistic value being a type of the cumulative statistic value is computed for the set of biased agent predictions. For the set of unbiased agent predictions for the working-class applicants including values 0, 1, 1 and 1, the unbiased cumulative statistic value is an approval rate of 75% for the working-class applicants. In an example embodiment, if the input dataset 108 does not include a working-class section with enough diversity in distribution of data, a suitable approval rate may be pre-determined for the rule without performing steps 508 and 510.

At 514, if a difference between the biased cumulative statistic value and the unbiased cumulative statistic value is greater than the comparison threshold, a punishment value is determined based at least in part on the difference between the biased cumulative statistic value and the unbiased cumulative statistic value. In one embodiment, the comparison threshold is pre-determined for each use case as it has different characteristics. In one example embodiment, the comparison threshold is a percentage-based value. For example, the comparison threshold is 5%. The difference between the biased cumulative statistic value being 25% and the unbiased cumulative statistic value being 75% is 50%. The assumption is made that the approval rate for the senior citizens is lower than that for the working-class applicants. If the approval rate is higher for senior citizens, there will not be any punishment when the rule is applied. The difference 50% is greater than the comparison threshold 5%. Therefore, a punishment value is determined using the punishment module 404 as 0.5 (i.e., dividing the difference by 100).

At 516, a weighted punishment value is computed using the assigned weight of the rule and the punishment value. The assigned weight is multiplied to the punishment value to compute the weighted punishment value. If the weight of rule is 1.25 and the punishment value is 0.5, then the weighted punishment value is 0.625 (1.25*0.5). The care is taken to not give too much weight to either rewards or punishments in comparison to the other because that tips the balance and the agent 202 only focuses on one of them and not the both. In an example embodiment, there may be multiple rules per bias. Also, there may be multiple biases for which multiple rules are developed. The method ends at step 516.

Similarly, each rule that includes one or more steps is applied to compute a corresponding weighted punishment value using the corresponding weight of the rule and the corresponding punishment value determined using the punishment module 404. As explained with reference to FIG. 4, a total of each weighted punishment value being the weighted punishment value 406 is fed to the interpreter 208 to generate the cumulative reward value 210. The interpreter 208 computes the cumulative reward value 210 by subtracting the weighted punishment value 406 from the reward value 304 received from the similarity module 302. Alternatively, the interpreter 208 computes the cumulative reward value 210 by subtracting each weighted punishment value computed based on applying each rule of the plurality of rules 402 from the reward value 304.

For example, if there is only one rule, the weighted punishment value i.e., 0.625 is subtracted from the reward value 304 (e.g., 1, determined based on cosine similarity), and the cumulative reward value 210 becomes 0.375. The interpreter 208 sends the computed cumulative reward value 210 to the RL agent 202. The RL agent 202 learns to reduce a plurality of biases from the plurality of agent predictions 204 while maintaining similarity with the plurality of model predictions 112 by maximizing the cumulative reward value 210. While learning, if the agent breaks another rule for the same agent prediction for which the weighted punishment value 406 is calculated as 1.70, then the cumulative reward value 210 for the agent 202 becomes negative −0.70 (i.e., 1-1.70).

Figure 6A:
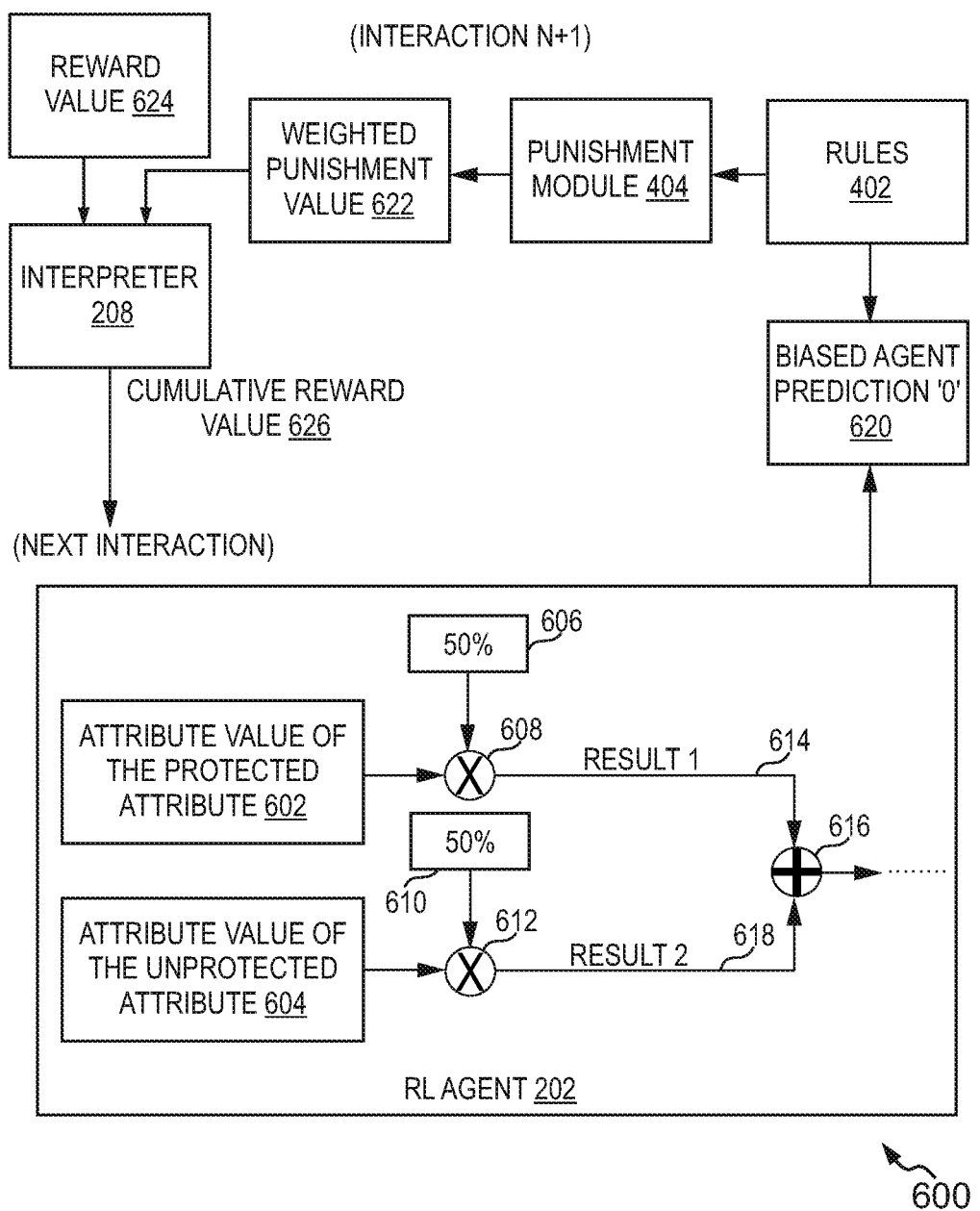
FIG. 6A is a block diagram representation of computing a cumulative reward value for a biased agent prediction generated by the RL agent for an iteration, in accordance with an example embodiment.
Figure 6B:
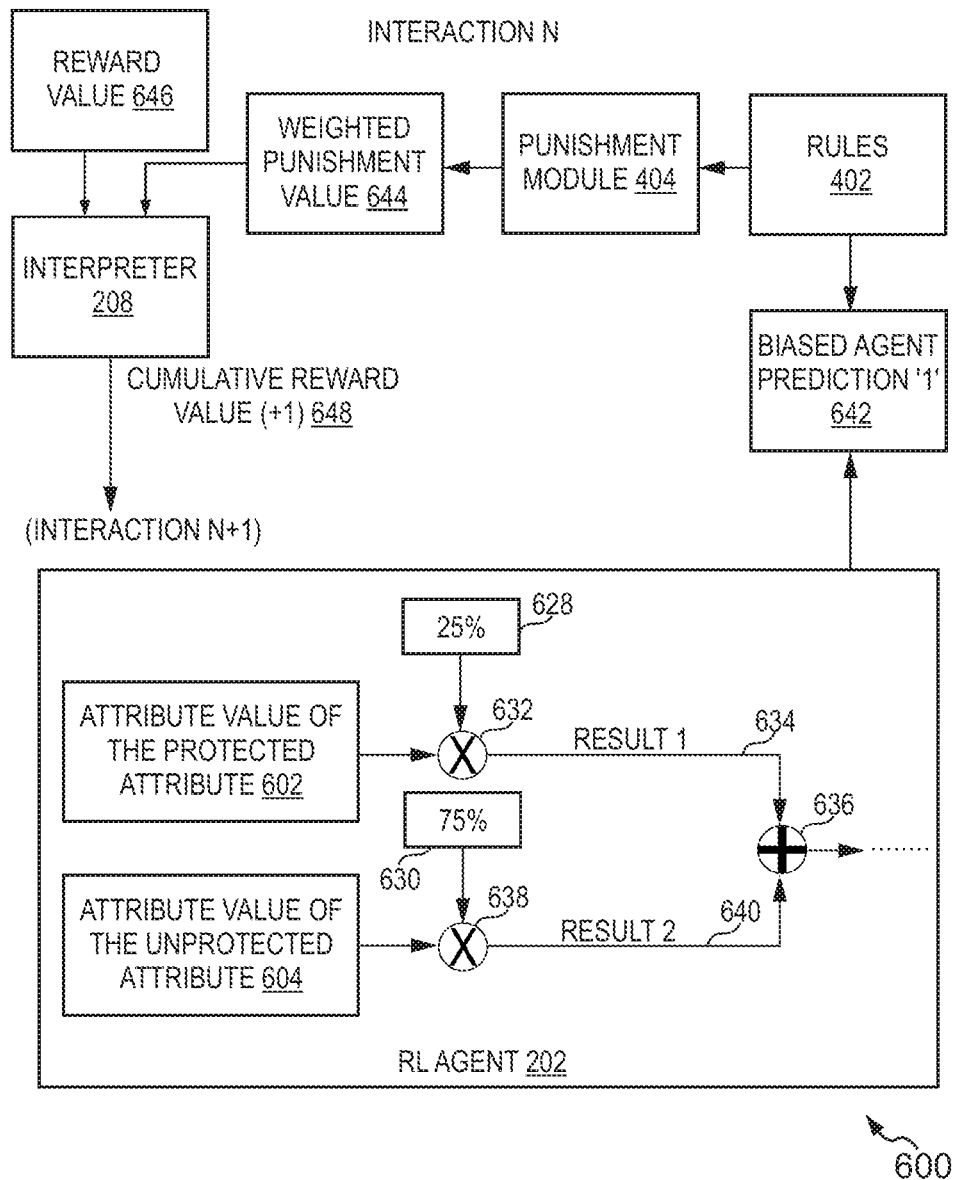
FIG. 6B is a block diagram representation of learning of the RL agent by utilizing the cumulative reward value computed in FIG. 6A to reduce a bias from the biased agent prediction in a subsequent iteration, in accordance with an example embodiment.

FIGS. 6A and 6B collectively represent learning of a Reinforcement Learning agent using a cumulative reward value in subsequent iterations, in accordance with an example embodiment. More specifically, FIG. 6A is a block diagram representation 600A of computing of a cumulative reward value for a biased agent prediction generated by an RL agent for an iteration, in accordance with an example embodiment. For an iteration 'n', the RL agent 202 is shown to have fed an attribute value (e.g., 65 years) of the protected attribute (e.g., age) (see, 602, hereinafter alternatively referred to as "attribute value 602") and an attribute value (e.g., 65,000 INR) of the unprotected attribute (e.g., salary) (see, 604, hereinafter alternatively referred to as "attribute value 604"). The attribute values 602 and 604 corresponding to the protected attribute and the unprotected attribute belong to a record of the plurality of records of the input dataset 108 as explained with reference to FIG. 1. Each agent prediction of the plurality of agent predictions 204 is generated for each record of the plurality of records of the input dataset 108.

The RL agent 202 assigns a prediction weight 606 and a prediction weight 610 to both the attribute values 602 and 604, respectively. As shown, a multiplier 608 uses the prediction weight 606 (i.e., 50%) on the attribute value 602 (i.e., 65 years). A corresponding result 614 is fed to an adder 616. Similarly, a multiplier 612 uses the prediction weight 610 (i.e., 50%) on the attribute value 604 (i.e., 65,000 INR). A corresponding result 618 is fed to the adder 616. The agent 202 generates a biased agent prediction 620 denoted as '0'. The binary value '0' as the biased agent prediction 620 denotes denial that the applicant of the age 65 having salary 65,000 INR will not repay the loan. The biased agent prediction 620 is fed to the rules 402.

As explained with reference to FIGS. 5A and 5B, the steps of the method 500 are performed on the biased agent prediction 620 and a weighted punishment value 622 is computed by the punishment module 404 using the pre-set weight of the applied rule. Thereafter, the weighted punishment value 622 and a reward value 624 generated from by the similarity module 302 based on similarity between the biased agent prediction 620 and a corresponding model prediction of the pre-trained model 110 is fed to the interpreter 208. The interpreter 208 is configured to generate a cumulative reward value 626 which may be positive or negative depending on the biases.

The cumulative reward value 626 is denoted as '−1' (representation of a negative reward/punishment) by subtracting the weighted punishment value 622 from the reward value 624. The cumulative reward value 626 denoted as '−1' means that the biased agent prediction 620 is biased. The cumulative reward value 626 is fed to a next iteration 'n+1' for learning of the agent 202. Where the applied rule suggests that there is a bias in the biased agent prediction 620 resulting in decrease of the cumulative reward value 626 for the agent 202, the agent 202 tries different paths for such instances and tries to reduce the punishment as much as possible while maintaining similarity with the model 110 to achieve the goal of maximizing the cumulative reward value 626. Ultimately, the agent 202 finds a balance between trying to match the model 110 while avoiding biases as much as possible.

FIG. 6B is a block diagram representation 600B of learning of the RL agent 202 by utilizing the cumulative reward value 626 computed in FIG. 6A to reduce a bias from the biased agent prediction 620 in a subsequent iteration 'n+1', in accordance with an example embodiment. As shown, the cumulative reward value 626 is fed to the agent 202 for the iteration 'n+1'. The agent 202 learns to deviate the path in this iteration as the cumulative reward value 626 is a negative reward and the goal of the agent is to maximize the cumulative reward value 626.

For the iteration 'n+1', the RL agent 202 learns to assign a prediction weight 628 (i.e., 25%) to attribute value 602 compared to the prediction weight 606 (i.e., 50%) of FIG. 6A for the protected attribute (i.e., age). The RL agent 202 further learns to assign a prediction weight 630 (i.e., 75%) to the attribute value 604 compared to the prediction weight 610 (i.e., 50%) of FIG. 6A for the unprotected attribute (i.e., salary). As shown, a multiplier 632 uses the prediction weight 628 (i.e., 25%) on the attribute value 602 (i.e., 65 years). A corresponding result 634 is fed to an adder 636. Similarly, a multiplier 638 uses the prediction weight 630 (i.e., 75%) on the attribute value 604 (i.e., 65,000 INR). A corresponding result 640 is fed to the adder 636. The agent 202 generates an unbiased agent prediction 642 denoted as '1'. The binary value '1' as the unbiased agent prediction 642 denotes approval that the applicant of the age 65 having salary 65,000 INR will repay the loan. The unbiased agent prediction 642 is fed to the rules 402.

As explained with reference to FIGS. 5A and 5B, the steps of the method 500 are performed on the unbiased agent prediction 642 and a weighted punishment value 644 is computed by the punishment module 404 using the pre-set weight of the rule. Thereafter, the weighted punishment value 644 and a reward value 646 generated by the similarity module 302 based on similarity between the unbiased agent prediction 642 and a corresponding model prediction of the model 110 are fed to the interpreter 208. The interpreter 208 is configured to generate a cumulative reward value 648 denoted as '+1' (representation of a positive reward) by subtracting the weighted punishment value 644 from the reward value 646. The cumulative reward value 648 is fed to a next iteration 'n+2' for learning of the agent 202.

Thus, the RL agent 202 keeps learning to maximize the cumulative reward value for the agent prediction such that the agent 202 can be as close to the model 110 as possible. Once the agent 202 has learnt to remove/reduce biases completely using the rules 402, instead of the original pre-trained model 110 with the biases, the agent 202 is utilized to predict if an applicant will repay the loan for a loan application without any biases. In an example embodiment, if there are any changes in the model 110 or the rules 402, the changes only need to be updated in the environment 206 and the rewards and punishments are adjusted accordingly. As the agent 202 learns with each iteration of the data that it processes and can always keep evolving, it is easier to fine tune the agent 202 for some new cases if provided with some labelled data.

Figure 7A:
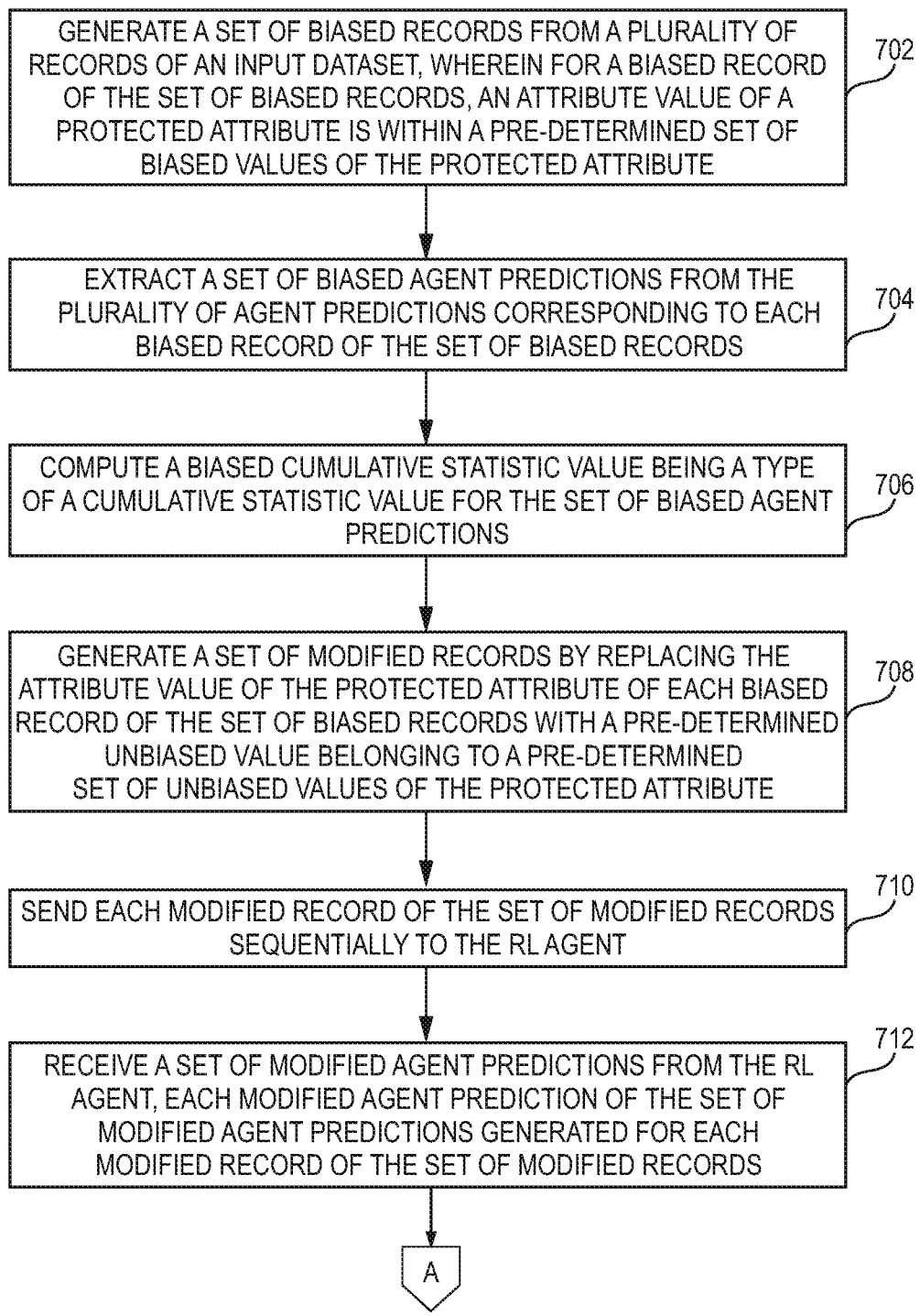
FIGS. 7A and 7B, collectively, illustrate a flow diagram of another method for determining a weighted punishment value, in accordance with an example embodiment.
Figure 7B:
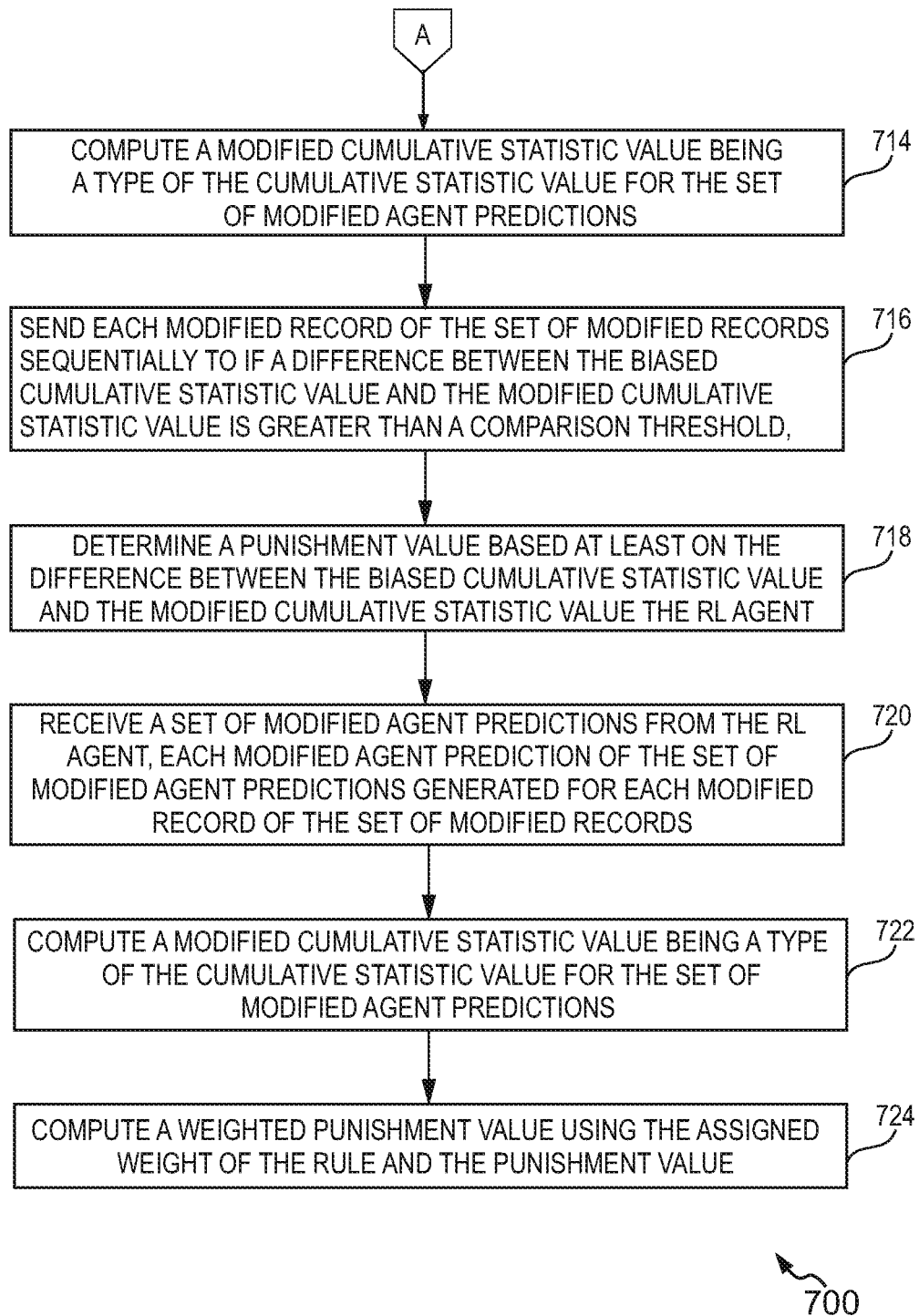

FIGS. 7A and 7B, collectively, illustrate a flow diagram of another method 700 for determining a weighted punishment value, in accordance with an example embodiment. More specifically, the method 700 includes one or more steps of another rule of the plurality of rules 402 performed by the computing system to determine the weighted punishment value 406 to be sent to the agent 202 based on identifying a plurality of biases present in the agent predictions 204 for maximizing the cumulative reward value 210. The rule is assigned a weight and the rule includes a protected attribute, a cumulative statistic value type, and a comparison threshold. The method starts at step 702.

At 702, a set of biased records from the plurality of records of the input dataset 108 is generated. For a biased record of the set of biased records, an attribute value of the protected attribute is within a pre-determined set of biased values of the protected attribute. Considering the model 110 being the loan repay model example as explained with reference to FIG. 1, if an attribute value (e.g., 67 years) of the protected attribute (age) of the plurality of attributes of a record of the plurality of records is within the pre-determined set of biased values (e.g., 60 to 100 years) of the protected attribute (age), a record is referred as a biased record. Accordingly, a set of such biased records is generated from the input dataset 108.

At 704, a set of biased agent predictions from the plurality of agent predictions 204 corresponding to each biased record of a set of biased records is extracted. As the RL agent 202 is fed the input dataset 108, and the set of biased records is generated from the input dataset 108, a corresponding set of biased agent predictions generated by the agent 202 is extracted. For example, the set of biased records includes values 62, 67, 78 and 80. The corresponding set of biased agent predictions for the senior citizens in binary calculation includes values 1, 0, 0 and 0. The binary value '0' as an agent prediction (i.e., a biased agent prediction) denotes denial that the applicants of age 67, 78 and 80 years will not repay the loan. The binary value '1' as an agent prediction (i.e., an unbiased agent prediction) denotes approval that the applicant of age 62 years will repay the loan. This may be the case where the agent 202 has learned from other attributes of the applicant such as a salary, the outstanding debt amount and the loan repay rates that he will repay the loan by generating an unbiased prediction.

At 706, a biased cumulative statistic value being a type of the cumulative statistic value is computed for the set of biased agent predictions. For the set of biased agent predictions for the senior citizens including values 1, 0, 0 and 0, the biased cumulative statistic value is an approval rate of 25% for the senior citizens.

At 708, a set of modified records from the plurality of records of the input dataset 108 is generated by replacing an attribute value of the protected attribute of each biased record of the set of biased records with a pre-determined unbiased value belonging to the pre-determined set of unbiased values of the protected attribute. For example, the set of biased records includes values 62, 67, 78 and 80, then the set of modified records would include values 35, 35, 35, 35, where 35 is an attribute value of the protected attribute (age) of the plurality of attributes of a record of the plurality of records within the pre-determined set of unbiased values (e.g., 30 to 40 years) of the protected attribute (age).

At 710, each modified record of the set of modified records is sequentially sent to the RL agent 202.

At 712, a set of modified agent predictions from the RL agent 202 is received. Each modified agent prediction of the set of modified agent predictions is generated for each modified record of the set of modified records. For example, for the set of modified records having values 35, 35, 35 and 35, the corresponding set of modified agent predictions include values 1, 1, 0 and 0. The binary value '1' as an agent prediction denotes approval that the first two applicants of age 35 years will repay the loan. The binary value '0' as an agent prediction denotes denial that third and fourth applicant of the age 35 years will not repay the loan. This may be the case where the agent 202 has learned from other attributes of the applicant such as salary, the outstanding debt amount and the loan repay rates that they will not repay the loan.

At 714, a modified cumulative statistic value being a type of the cumulative statistic value is computed for the set of modified agent predictions. The set of modified agent predictions includes values 1, 1, 0 and 0, the modified cumulative statistic value is an approval rate of 50%.

At 716, if a difference between the biased cumulative statistic value and the modified cumulative statistic value is greater than the comparison threshold, a punishment value is determined based at least in part on the difference between the biased cumulative statistic value and the modified cumulative statistic value. For example, the comparison threshold is predetermined as 5%. The difference between the biased cumulative statistic value being 25% and the modified cumulative statistic value being 50% is 25%. The difference 25% is greater than the comparison threshold 5%. Therefore, a punishment value is determined using the punishment module 404 as 0.25 (dividing the difference by 100).

At 718, a weighted punishment value is computed using the assigned weight of the rule and the punishment value. The assigned weight is multiplied to the punishment value to compute the weighted punishment value. If the weight of rule is 1.25 and the punishment value is 0.25 then, the weighted punishment value is 0.312 (1.25*0.25). The method ends at step 718.

Similarly, each rule that includes one or more steps is applied to compute a corresponding weighted punishment value using the corresponding weight of the rule and the corresponding punishment value determined using the punishment module 404. As explained with reference to FIG. 4, a total of each weighted punishment value is fed to the interpreter 208 to generate the cumulative reward value 210. The interpreter 208 computes the cumulative reward value 210 by subtracting the weighted punishment value 406 from the reward value 304 received from the similarity module 302. Alternatively, the interpreter 208 computes the cumulative reward value 210 by subtracting each weighted punishment value computed based on applying each rule of the plurality of rules 402 from the reward value 304.

For example, if there is only one rule, the weighted punishment value i.e., 0.312 is subtracted from the reward value 304 (e.g., 1, determined based on cosine similarity), and the cumulative reward value 210 becomes 0.688. The interpreter 208 sends the computed cumulative reward value 210 to the RL agent 202. The RI, agent 202 learns to reduce a plurality of biases from the plurality of agent predictions 204 while maintaining similarity with the plurality of model predictions 112 by maximizing the cumulative reward value 210.

In one example embodiment, there may arise a need to introduce a new rule to be integrated for other protected attributes such as gender, race, state etc. for checking if the applicant will repay a loan. The agent 202 also needs to quickly adapt to the addition of the new rule, however, there may not be many instances of the agent 202 violating a new rule, may be because those instances are rare or the agent 202 rarely gets them wrong because of the other rules with higher weights in place. New rules for reducing existing biases and/or new biases can be updated for the model 110 very easily by introducing the new rules to the agent 202 and letting the agent 202 learn through each iteration of input dataset 108 than having to get enough examples for those biases and re-training the model 110. As the distribution of the biased value for the protected attributes may be very low (which is the cause of the bias), initially, the weight of a new rule is kept higher than the older rules. Even if the distribution is even, assigning a higher weight helps speed up the integration of the new rule.

The weight is slowly decreased with each occurrence of the instance so that the agent 202 can develop new states and paths to deal with those instances sooner. The decrement of the weight is stopped once a pre-set weight value is reached for the new rule. For example, there are currently two rules present, each with weight assigned as 0.5 and 1, respectively. Because the agent 202 has been working with these rules for so long, the agent 202 has created enough learnings for those rules based on the rewards and punishments received. To make a new rule implemented quicker and to make the agent 202 adapt to the new rule quicker, the weight for the new rule is increased to 3 or 4 at the time of introducing. An exponential function is used to trade over a time-period until the new weight reaches a pre-defined weight value for (e.g., 1.25) the new rule. The decrement of weight is applied only for the new rule for an existing bias or a new bias so that the agent 202 has seen enough examples to reach the pre-defined weight value. The exponential function is applied using below equation:

$$w' = w + m \times e^{-\frac{x}{10}}$$

$$w'' = \begin{cases} w' & \text{if } |w' - w| > \varepsilon \\ w & \text{otherwise} \end{cases}$$

where x is a number of weighted punishment values determined so far for breaking the new rule, m is a pre-determined multiplicative factor used to increase the weighted punishment values, w is a pre-defined weight for the new rule, ε is a predefined constant value, and w" is the new weight of the rule.

Although the foregoing figures explain various features of the present disclosure using an example of the model 110 being a loan repay model, in various embodiments, the model 110 can be any AI model capable of generating model predictions for different real-life use cases without deviating from the scope of the disclosure. For example, the model 110 can be developed for Sales or Human Resources department of an enterprise willing to hire new candidates. Basically, various features of the disclosure are specifically useful for any input data of an AI model that involves human attributes like gender, race, nationality, locality, state, religion etc. which could turn in to biased predictions of the AI model.

For example, an AI model is developed to predict recidivism risk score among African Americans than Caucasian population and has a much higher rate of false positives for African American population. The model essentially gives too much weight to a specific feature of the data like race while making model predictions, which is not correct ethically or even technically because this is a result of lack of data with enough variance for every combinations of features. Even if race is excluded as an input to score a person's recidivism risk, the other features might be correlated with race and encourage bias when judging a candidate's risk.

To reduce such biases, the RL agent can be trained using a plurality of records being candidates with criminal records. A plurality of attributes of a record includes age, race, gender, prior offences, subsequent offence etc. of a candidate. An example of a unique attribute value of each attribute in this scenario includes '45 (years)', 'African American', 'male', 'one petty theft', 'none', respectively. Similarly, the next record may have attribute values for the corresponding plurality of attributes as '25 (years)', 'Caucasian', 'Male', 'drug trafficking', 'grand theft', respectively.

The steps of the method 500 are applied as follows to reduce the bias (i.e., race). The set of biased records includes all the attribute values representing African Americans (e.g., 4 African American candidates are considered). A corresponding set of biased agent predictions generated by the agent 202 includes values, for example, low risk (e.g., 0), medium risk (e.g., 1), high risk (e.g., 2) and high risk (e.g., 2). The set of unbiased records includes all the attribute values representing Caucasians (e.g., 4 Caucasian candidates are considered). A corresponding set of unbiased agent predictions generated by the agent 202 includes values, for example, low risk (e.g., 0), low risk (e.g., 0), medium risk (e.g., 1) and high risk (e.g., 2). Assumption is made that there is enough data available for the Caucasian population compared to the African American population. For the set of biased agent predictions for the African American candidates including values 0, 1, 2 and 2, the biased cumulative statistic value is an average recidivism risk score of 1.25 for the African American candidates. For the set of unbiased agent predictions for the Caucasian candidates including values 0, 0, 1 and 2, the unbiased cumulative statistic value is an average recidivism risk score of 0.75 for the Caucasian candidates.

Further, for instance, the comparison threshold is pre-set as 0.1. The difference between the biased cumulative statistic value being 1.25 and the unbiased cumulative statistic value being 0.75 is 0.5. The difference 0.5 is greater than the comparison threshold 0.1. Therefore, a punishment value is determined using the punishment module 404 as 0.05 (dividing the difference by 10). If the weight of rule is 1.25 and the punishment value is 0.05 then, the weighted punishment value is 0.0625 (1.25*0.05). For example, if there is only one rule, the weighted punishment value i.e., 0.0625 is subtracted from a reward value (e.g., 1, generated using cosine similarity), and the cumulative reward value becomes 0.0375. The interpreter 208 sends the computed cumulative reward value to the RL agent 202. The RL agent 202 learns to reduce the bias of race from the agent predictions by utilizing the cumulative reward value 210. Thus, to remove shortcoming of an AI model, Reinforcement Learning is used with a rule-based system to detect the shortcomings and develop an algorithm (i.e., the agent) that can be used instead of the original model with shortcomings.

Figure 8A:
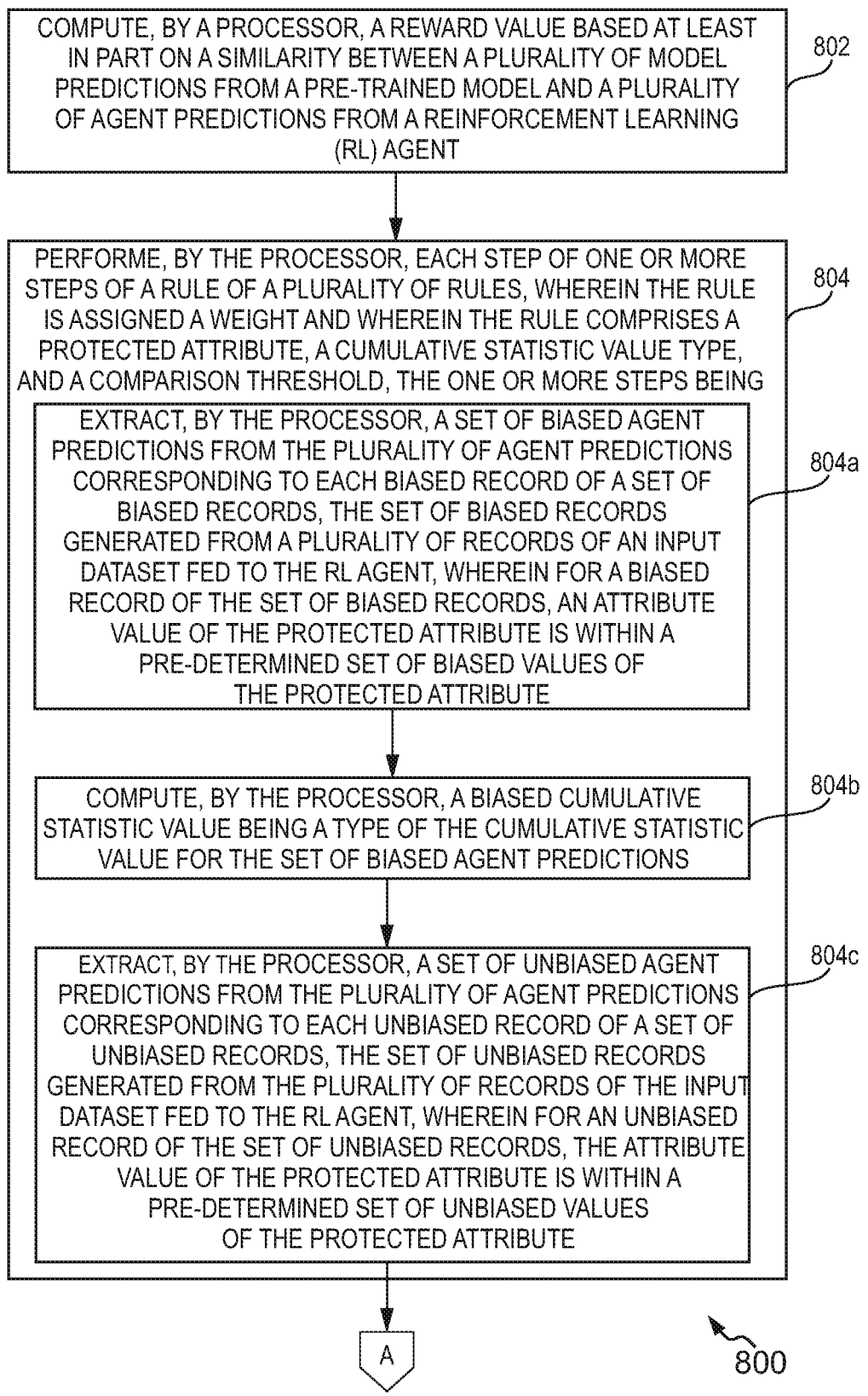
FIGS. 8A and 8B collectively illustrate a flow diagram of a method for reducing biases in an Artificial Intelligence (AI) model, in accordance with an example embodiment.
Figure 8B:
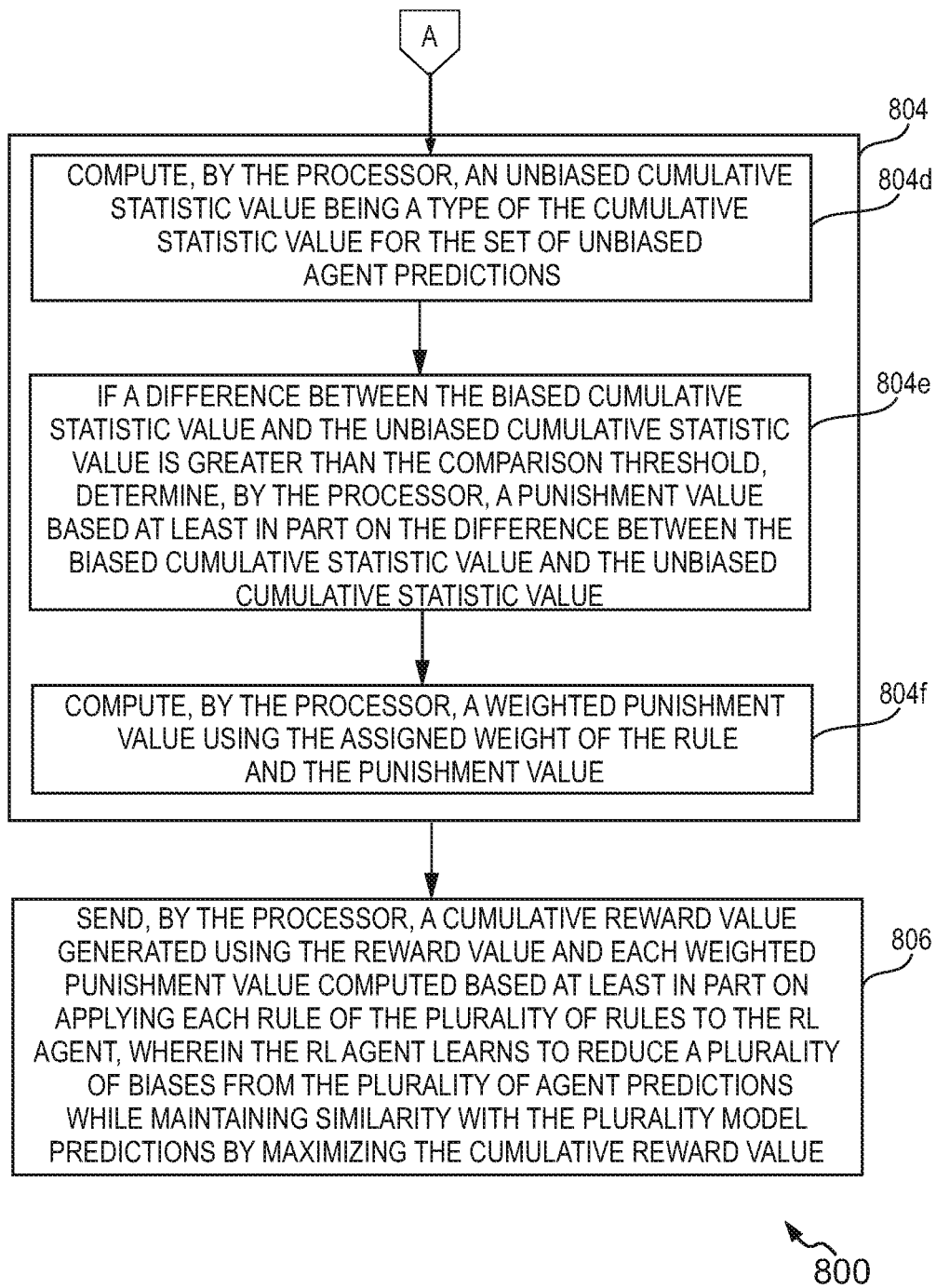

FIGS. 8A and 8B collectively illustrate a flow diagram of a method 800 for reducing biases in an AI model, in accordance with an example embodiment. More specifically, the method 800 for reducing a plurality of biases from a pre-trained AI model by training a reinforcement learning agent is disclosed. The method 800 depicted in the flow diagram may be executed by, for example, a computing system. Operations of the method 800, and combinations of operation in the method 800, may be implemented by, for example, hardware, firmware, a processor, circuitry and/or a different device associated with the execution of software that includes one or more computer program instructions. The method 800 starts at operation 802.

At 802, the method 800 includes computing, by a processor (of a computing system), a reward value based at least in part on a similarity between a plurality of model predictions from a pre-trained model and a plurality of agent predictions from a Reinforcement Learning (RL) agent.

At 804, the method includes, performing, by the processor, each step of one or more steps of a rule of a plurality of rules. The rule is assigned a weight and the rule includes a protected attribute, a cumulative statistic value type, and a comparison threshold.

For performing the one or more steps of the rule, at 804a, the method 800 includes extracting, by the processor, a set of biased agent predictions from the plurality of agent predictions corresponding to each biased record of a set of biased records. The set of biased records is generated from a plurality of records of an input dataset fed to the RL agent. For a biased record of the set of biased records, an attribute value of the protected attribute is within a pre-determined set of biased values of the protected attribute.

At 804b, the method 800 includes computing, by the processor, a biased cumulative statistic value being a type of the cumulative statistic value for the set of biased agent predictions.

At 804c, the method 800 includes extracting, by the processor, a set of unbiased agent predictions from the plurality of agent predictions corresponding to each unbiased record of a set of unbiased records. The set of unbiased records is generated from the plurality of records of the input dataset fed to the RL agent. For an unbiased record of the set of unbiased records, the attribute value of the protected attribute is within a pre-determined set of unbiased values of the protected attribute.

At 804d, the method 800 includes computing, by the processor, an unbiased cumulative statistic value being a type of the cumulative statistic value for the set of unbiased agent predictions.

If a difference between the biased cumulative statistic value and the unbiased cumulative statistic value is greater than the comparison threshold, at 804e, the method 800 includes determining, by the processor, a punishment value based at least in part on the difference between the biased cumulative statistic value and the unbiased cumulative statistic value.

At 804f, the method 800 includes computing, by the processor, a weighted punishment value using the assigned weight of the rule and the punishment value.

At 806, the method 800 includes sending, by the processor, a cumulative reward value generated using the reward value and each weighted punishment value computed based at least in part on applying each rule of the plurality of rules to the RL agent. The RL agent learns to reduce a plurality of biases from the plurality of agent predictions while maintaining similarity with the plurality of model predictions by maximizing the cumulative reward value. The method 800 completes at operation 806.

Figure 9:
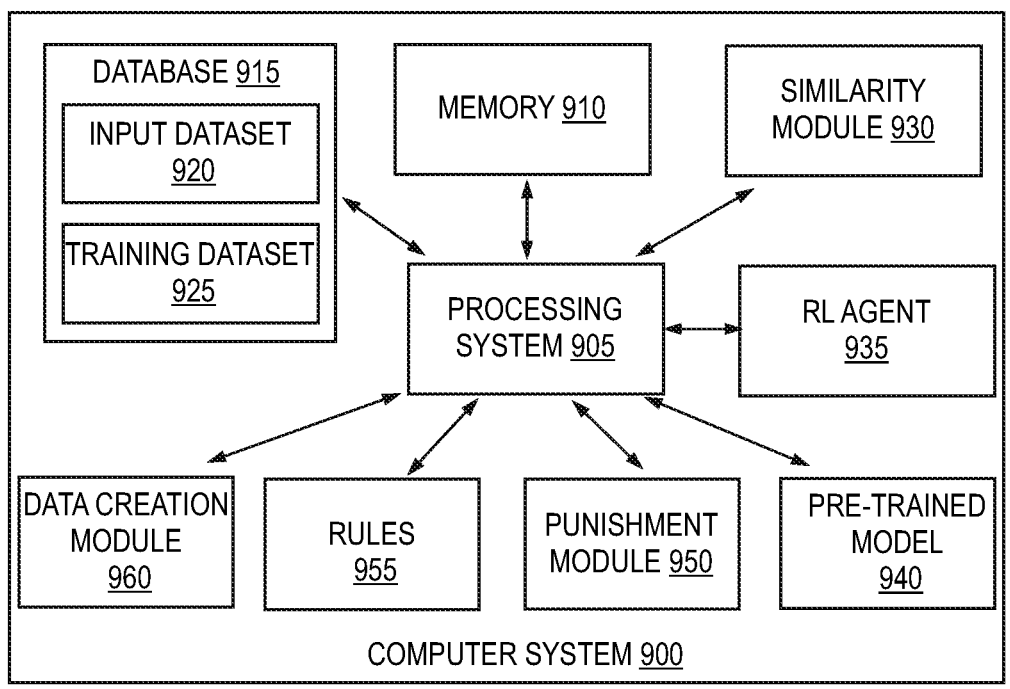
FIG. 9 is a simplified block diagram of a computing system, in accordance with one embodiment of the present disclosure.

FIG. 9 is a simplified block diagram of a computing system 900, in accordance with one embodiment of the present disclosure. The computing system 900 includes at least one processor 905 for executing instructions. Instructions may be stored in, for example, but not limited to, a memory 910. The processor 905 may include one or more processing units (e.g., in a multi-core configuration). In one embodiment, the processor 905 may be operatively coupled to a communication interface (not shown) such that the computing system 900 is capable of communicating with a remote device (not shown). The components of the computing system 900 provided herein may not be exhaustive, and that the computing system 900 may include more or fewer components than those depicted in FIG. 9. Further, two or more components may be embodied in one single component, and/or one component may be configured using multiple sub-components to achieve the desired functionalities. Some components of the computing system 900 may be configured using hardware elements, software elements, firmware elements and/or a combination thereof.

In an embodiment, the processor 905 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 910 is configured to store machine executable instructions to be accessed by the processor 905. The memory 910 can be any type of storage accessible to the processor 905. For example, the memory 910 may include volatile or non-volatile memories, or a combination thereof.

In some non-limiting examples, the memory 910 can be four to sixty-four Gigabytes (GB) of Dynamic Random Access Memory ("DRAM") or Static Random Access Memory ("SRAM"). In addition, some examples may include supplementary flash memory installed via a PCMCIA slot.

The processor 905 may also be operatively coupled to a database 915. In some embodiments, the database 915 is integrated within the computing system 900. For example, the computing system 900 may include one or more hard disk drives as the database 915. The database 915 may include multiple storage units such as hard disks and/or solid-state disks in a redundant array of inexpensive disks (RAID) configuration. The database 915 may include a storage area network (SAN) and/or a network attached storage (NAS) system. In other embodiments, the database 915 may be external to the computing system 900 and may be accessed by the computing system 900 using a storage interface (not shown). The storage interface may be any component capable of providing the processor 905 with access to the database 915. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 905 with access to the database 915.

The database 915 is suitable for storing and/or retrieving data, such as, but not limited to, an input dataset 920 and a training dataset 925. The training dataset 925 is retrieved by the processor 905 to train an AI model (not shown). The AI model trained using the training dataset 925 is shown as a pre-trained model 940. The input dataset 920 is retrieved by the processor 905 from the database 915 for feeding to the pre-trained model 940 (hereinafter alternatively referred to as "model 940") to generate corresponding model predictions for a plurality of records of the input dataset 920. The input dataset 920 includes a plurality of records. Further, a record of the plurality of records includes a plurality of attribute values of a corresponding plurality of attributes. Each record of the plurality of records of the input dataset 920 is sequentially sent to the model 940 by the processor 905. Also, each record of the plurality of records of the input dataset 920 is sequentially sent to a Reinforcement Learning (RL) agent 935 (hereinafter alternatively referred to as "RL agent 935") to generate corresponding plurality of agent predictions.

The plurality of model predictions and the plurality of agent predictions are sent to a similarity module 930. The processor 905, in conjunction with the similarity module 930, is configured to compute a reward value based on similarity between the plurality of model predictions and the plurality of agent predictions. The computed reward value is sent to an interpreter 945 operatively coupled to the processor 905. The plurality of agent predictions is also sent to a punishment module 950 configured to compute a weighted punishment value based on application of each rule of a plurality of rules 955 (hereinafter referred to as "rules 955") via the processor 905. Essential parameters of a rule of the rules 955 include such as, but not limited to, a protected attribute, a cumulative statistic value type, a comparison threshold, a pre-determined set of biased values of the protected attribute, a predetermined set of unbiased values of the protected attribute (i.e., a feature for which there is minimal bias), a weight assigned to the rule (for other biases or the same bias) and the like.

The assigned weight is used by the processor 905 to compute the weighted punishment value via the punishment module 950. The processor 905 is configured to process each step of one or more steps of a rule as explained with reference to FIGS. 5A-5B, and 8 to determine a punishment value using which the weighted punishment value is computed. The weighted punishment value and the reward value computed by the similarity module 930 are sent to the interpreter 945 to generate a cumulative reward value. Further, the cumulative reward value is sent to the RL agent 935 for learning to reduce biases present in the agent predictions.

Moreover, the processor 905 is configured to process each step of the one or more steps of another rule as explained with reference to FIGS. 7A and 7B to determine a punishment value using which the weighted punishment value is computed. A data creation module 960 receives each record of the plurality of records of the input dataset 920. The data creation module 960 is configured to create a modified dataset that includes a modified set of records generated by replacing an attribute value of the protected attribute of each biased record of a set of biased records with a pre-determined unbiased value belonging to a pre-determined set of unbiased values of the protected attribute. The set of biased records is generated from a plurality of records of the input dataset 920 fed to the RL agent 935, where for a biased record, an attribute value of the protected attribute is within a pre-determined set of biased values of the protected attribute. The processor 905 sends the modified dataset generated by the data creation module 960 to the RL agent 935 to generate a corresponding set of modified agent predictions from the RL agent 935 which are fed to the punishment module 950 for computing the weighted punishment value based on applying a corresponding rule (i.e., method 700 of FIGS. 7A and 7B) of the rules 955.

The disclosed method with reference to FIGS. 8A and 8B, or one or more operations of the method 800 may be implemented using software including computer-executable instructions stored on one or more computer-readable media (e.g., non-transitory computer-readable media), such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the computing system 900 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and are well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method, the method comprising:
    computing, by a processor, a reward value based, at least in part on a similarity between a plurality of model predictions from a pre-trained model and a plurality of agent predictions from a Reinforcement Learning (RL) agent;
    performing, by the processor, each step of one or more steps of a rule of a plurality of rules, wherein the rule is assigned a weight and wherein the rule comprises a protected attribute, a cumulative statistic value type, and a comparison threshold, the one or more steps being:
        extracting, by the processor, a set of biased agent predictions from the plurality of agent predictions corresponding to each biased record of a set of biased records, the set of biased records generated from a plurality of records of an input dataset fed to the RL agent, wherein for a biased record of the set of biased records, an attribute value of the protected attribute is within a pre-determined set of biased values of the protected attribute;
        computing, by the processor, a biased cumulative statistic value being a type of the cumulative statistic value for the set of biased agent predictions;
        extracting, by the processor, a set of unbiased agent predictions from the plurality of agent predictions corresponding to each unbiased record of a set of unbiased records, the set of unbiased records generated from the plurality of records of the input dataset fed to the RL agent, wherein for an unbiased record of the set of unbiased records, the attribute value of the protected attribute is within a pre-determined set of unbiased values of the protected attribute;
        computing, by the processor, an unbiased cumulative statistic value being a type of the cumulative statistic value for the set of unbiased agent predictions;
        if a difference between the biased cumulative statistic value and the unbiased cumulative statistic value is greater than the comparison threshold, determining, by the processor, a punishment value based at least in part on the difference between the biased cumulative statistic value and the unbiased cumulative statistic value; and
        computing, by the processor, a weighted punishment value using the assigned weight of the rule and the punishment value; and
    sending, by the processor, a cumulative reward value generated using the reward value and each weighted punishment value computed based at least in part on applying each rule of the plurality of rules to the RL agent, wherein the RL agent learns to reduce a plurality of biases from the plurality of agent predictions while maintaining similarity with the plurality of model predictions by maximizing the cumulative reward value.

2. The method as claimed in claim 1, further comprising:
    sending each record of the plurality of records of the input dataset sequentially to the RL agent, a record of the plurality of records comprising a plurality of attribute values of a corresponding plurality of attributes.

3. The method as claimed in claim 2, further comprising:
    receiving the plurality of agent predictions from the RL agent, each agent prediction of the plurality of agent predictions generated for each record of the plurality of records of the input dataset.

4. The method as claimed in claim 2, further comprising:
    sending each record of the plurality of records of the input dataset sequentially to the pre-trained model; and
    receiving the plurality of model predictions generated by the pre-trained model, each model prediction of the plurality of model predictions generated for each record of the plurality of records of the input dataset, wherein a model prediction of the plurality of model predictions is one of a biased prediction and an unbiased prediction and wherein the pre-trained model generates the biased prediction if the attribute value of the protected attribute of the plurality of attributes of the record is within the pre-determined set of biased values of the protected attribute and wherein the pre-trained model generates the unbiased prediction if the attribute value of the protected attribute of the plurality of attributes of the record is within the pre-determined set of unbiased values of the protected attribute.

5. The method as claimed in claim 1, wherein the cumulative reward value is generated by subtracting each weighted punishment value computed based on applying each rule of the plurality of rules from the reward value.

6. The method as claimed in claim 1, wherein for computing a weighted punishment value, the method further comprises:
    generating a set of modified records by replacing the attribute value of the protected attribute of each biased record of the set of biased records with a pre-determined unbiased value belonging to the pre-determined set of unbiased values of the protected attribute.

7. The method as claimed in claim 6, further comprising:
    sending each modified record of the set of modified records sequentially to the RL agent; and
    receiving a set of modified agent predictions from the RL agent, each modified agent prediction of the set of modified agent predictions generated for each modified record of the set of modified records.

8. The method as claimed in claim 7, further comprising:
    computing a modified cumulative statistic value being a type of the cumulative statistic value for the set of modified agent predictions; and
    if a difference between the biased cumulative statistic value and the modified cumulative statistic value is greater than the comparison threshold, determining the punishment value based at least on the difference between the biased cumulative statistic value and the modified cumulative statistic value.

9. The method as claimed in claim 1, further comprising:
    adding a new rule from the plurality of rules for reducing at least one of a new bias and an existing bias of the plurality of biases from the plurality of agent predictions;
    computing a new weight to be assigned for the new rule using:

$$w' = w + m \times e^{-\frac{x}{10}}$$

$$w'' = \begin{cases} w' & \text{if } |w' - w| > \varepsilon \\ w & \text{otherwise} \end{cases}$$

where x is a number of weighted punishment values determined so far for breaking the new rule, m is a pre-determined multiplicative factor used to increase the weighted punishment values,
w is a pre-defined weight for the new rule,
ε is a predefined constant value, and
w" is the new weight of the rule; and
assigning the new weight w" to the new rule.

10. A computing system, comprising:
a memory comprising executable instructions; and
a processor configured to execute the instructions to cause the computing system to at least:
compute a reward value based at least in part on a similarity between a plurality of model predictions from a pre-trained model and a plurality of agent predictions from a Reinforcement Learning (RL) agent;
perform each step of one or more steps of a rule of a plurality of rules, wherein the rule is assigned a weight and wherein the rule comprises a protected attribute, a cumulative statistic value type, and a comparison threshold, the one or more steps being:
extract a set of biased agent predictions from the plurality of agent predictions corresponding to each biased record of a set of biased records, the set of biased records generated from a plurality of records of an input dataset fed to the RL agent, wherein for a biased record of the set of biased records, an attribute value of the protected attribute is within a pre-determined set of biased values of the protected attribute;
compute a biased cumulative statistic value being a type of the cumulative statistic value for the set of biased agent predictions;
extract a set of unbiased agent predictions from the plurality of agent predictions corresponding to each unbiased record of a set of unbiased records, the set of unbiased records generated from the plurality of records of the input dataset fed to the RL agent, wherein for an unbiased record of the set of unbiased records, the attribute value of the protected attribute is within a pre-determined set of unbiased values of the protected attribute;
compute an unbiased cumulative statistic value being a type of the cumulative statistic value for the set of unbiased agent predictions;
if a difference between the biased cumulative statistic value and the unbiased cumulative statistic value is greater than the comparison threshold, determine a punishment value based at least in part on the difference between the biased cumulative statistic value and the unbiased cumulative statistic value; and
compute a weighted punishment value using the assigned weight of the rule and the punishment value; and
send a cumulative reward value generated using the reward value and each weighted punishment value computed based at least in part on applying each rule of the plurality of rules to the RL agent, wherein the RL agent learns to reduce a plurality of biases from the plurality of agent predictions while maintaining similarity with the plurality of model predictions by maximizing the cumulative reward value.

11. The computing system as claimed in claim 10, wherein the computing system is further caused to:
send each record of the plurality of records of the input dataset sequentially to the RL agent, a record of the plurality of records comprising a plurality of attribute values of a corresponding plurality of attributes.

12. The computing system as claimed in claim 11, wherein the computing system is further caused to:
receive the plurality of agent predictions from the RL agent, each agent prediction of the plurality of agent predictions generated for each record of the plurality of records of the input dataset.

13. The computing system as claimed in claim 11, wherein the computing system is further caused to:
send each record of the plurality of records of the input dataset sequentially to the pre-trained model; and
receive the plurality of model predictions generated by the pre-trained model, each model prediction of the plurality of model predictions generated for each record of the plurality of records of the input dataset, wherein a model prediction of the plurality of model predictions is one of a biased prediction and an unbiased prediction and wherein the pre-trained model generates the biased prediction if the attribute value of the protected attribute of the plurality of attributes of the record is within the pre-determined set of biased values of the protected attribute and wherein the pre-trained model generates the unbiased prediction if the attribute value of the protected attribute of the plurality of attributes of the record is within the pre-determined set of unbiased values of the protected attribute.

14. The computing system as claimed in claim 10, wherein the cumulative reward value is generated by subtracting each weighted punishment value computed based on applying each rule of the plurality of rules from the reward value.

15. The computing system as claimed in claim 10, wherein for computing a weighted punishment value, the computing system is further caused to:
generate a set of modified records by replacing the attribute value of the protected attribute of each biased record of the set of biased records with a pre-determined unbiased value belonging to the pre-determined set of unbiased values of the protected attribute.

16. The computing system as claimed in claim 15, wherein the computing system is further caused to:
send each modified record of the set of modified records sequentially to the RL agent; and
receive a set of modified agent predictions from the RL agent, each modified agent prediction of the set of modified agent predictions generated for each modified record of the set of modified records.

17. The computing system as claimed in claim 16, wherein the computing system is further caused to:
compute a modified cumulative statistic value being a type of the cumulative statistic value for the set of modified agent predictions; and
if a difference between the biased cumulative statistic value and the modified cumulative statistic value is greater than the comparison threshold, determine the punishment value based at least on the difference between the biased cumulative statistic value and the modified cumulative statistic value.

18. The computing system as claimed in claim 10, wherein the computing system is further caused to:
add a new rule from the plurality of rules for reducing at least one of a new bias and an existing bias of the plurality of biases from the plurality of agent predictions;

compute a new weight to be assigned for the new rule using:

$$w' = w + m \times e^{-\frac{x}{10}}$$

$$w'' = \begin{cases} w' & \text{if } |w' - w| > \varepsilon \\ w & \text{otherwise} \end{cases}$$

where x is a number of weighted punishment values determined so far for breaking the new rule,
m is a pre-determined multiplicative factor used to increase the weighted punishment values,
w is a pre-defined weight for the new rule,
$\varepsilon$ is a predefined constant value, and
w" is the new weight of the rule; and
assign the new weight w" to the new rule.

19. A computer program product comprising at least one non-transitory computer-readable storage medium, the computer-readable storage medium comprising a set of instructions, which, when executed by one or more processors in an electronic device, cause the electronic device to at least:
compute a reward value based at least in part on a similarity between a plurality of model predictions from a pre-trained model and a plurality of agent predictions from a Reinforcement Learning (RL) agent;
perform each step of one or more steps of a rule of a plurality of rules, wherein the rule is assigned a weight and wherein the rule comprises a protected attribute, a cumulative statistic value type, and a comparison threshold, the one or more steps being:
  extract a set of biased agent predictions from the plurality of agent predictions corresponding to each biased record of a set of biased records, the set of biased records generated from a plurality of records of an input dataset fed to the RL agent, wherein for a biased record of the set of biased records, an attribute value of the protected attribute is within a pre-determined set of biased values of the protected attribute;
  compute a biased cumulative statistic value being a type of the cumulative statistic value for the set of biased agent predictions;
  extract a set of unbiased agent predictions from the plurality of agent predictions corresponding to each unbiased record of a set of unbiased records, the set of unbiased records generated from the plurality of records of the input dataset fed to the RL agent, wherein for an unbiased record of the set of unbiased records, the attribute value of the protected attribute is within a pre-determined set of unbiased values of the protected attribute;
  compute an unbiased cumulative statistic value being a type of the cumulative statistic value for the set of unbiased agent predictions;
  if a difference between the biased cumulative statistic value and the unbiased cumulative statistic value is greater than the comparison threshold, determine a punishment value based at least in part on the difference between the biased cumulative statistic value and the unbiased cumulative statistic value; and
  compute a weighted punishment value using the assigned weight of the rule and the punishment value; and
send a cumulative reward value generated using the reward value and each weighted punishment value computed based at least in part on applying each rule of the plurality of rules to the RL agent, wherein the RL agent learns to reduce a plurality of biases from the plurality of agent predictions while maintaining similarity with the plurality of model predictions by maximizing the cumulative reward value.

20. The computer program product as claimed in claim 19, wherein the electronic device is further caused to:
add a new rule from the plurality of rules for reducing at least one of a new bias and an existing bias of the plurality of biases from the plurality of agent predictions;
compute a new weight to be assigned for the new rule using:

$$w' = w + m \times e^{-\frac{x}{10}}$$

$$w'' = \begin{cases} w' & \text{if } |w' - w| > \varepsilon \\ w & \text{otherwise} \end{cases}$$

where x is a number of weighted punishment values determined so far for breaking the new rule,
m is a pre-determined multiplicative factor used to increase the weighted punishment values,
w is a pre-defined weight for the new rule,
$\varepsilon$ is a predefined constant value, and
w" is the new weight of the rule; and
assign the new weight w" to the new rule.

* * * * *